US009635314B2

(12) United States Patent
Barkley et al.

(10) Patent No.: US 9,635,314 B2
(45) Date of Patent: Apr. 25, 2017

(54) TECHNIQUES FOR MANAGING VISUAL COMPOSITIONS FOR A MULTIMEDIA CONFERENCE CALL

(71) Applicant: MICROSOFT TECHNOLOGY LICENSING, LLC, Redmond, WA (US)

(72) Inventors: Warren V Barkley, Mill Creek, WA (US); Philip A Chou, Bellevue, WA (US); Regis J Crinon, Redmond, WA (US); Tim Moore, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 14/296,990

(22) Filed: Jun. 5, 2014

(65) Prior Publication Data

US 2014/0376609 A1  Dec. 25, 2014

Related U.S. Application Data

(63) Continuation of application No. 11/511,749, filed on Aug. 29, 2006, now Pat. No. 8,773,494.

(51) Int. Cl.
*H04N 7/14* (2006.01)
*H04N 7/15* (2006.01)
*H04N 19/187* (2014.01)
*H04L 29/06* (2006.01)

(52) U.S. Cl.
CPC ............... *H04N 7/15* (2013.01); *H04N 7/14* (2013.01); *H04N 7/147* (2013.01); *H04N 7/152* (2013.01); *H04N 19/187* (2014.11); *H04L 65/403* (2013.01)

(58) Field of Classification Search
CPC .......... H04N 7/147; H04N 7/152; H04N 7/15; H04N 19/187; H04N 7/14; H04L 65/403
USPC ....... 348/14.01–14.16; 375/240.02; 370/260; 709/204
See application file for complete search history.

(56) References Cited

U.S. PATENT DOCUMENTS 5,751,791 A  5/1998 Chen et al.
6,014,694 A  1/2000 Aharoni et al.
6,075,571 A  6/2000 Kuthyar et al.
(Continued)

FOREIGN PATENT DOCUMENTS

CN  1515118  7/2004
EP  1465427  10/2004
(Continued)

OTHER PUBLICATIONS

Extended European Search Report received for European patent Application No. 07814101.7, mailed Oct. 2, 2014, 10 pages.
(Continued)

*Primary Examiner* — Melur Ramakrishnaiah

(57) ABSTRACT

Techniques for managing visual compositions for a multimedia conference call are described. An apparatus may comprise a processor to allocate a display object bit rate for multiple display objects where a total display object bit rate for all display objects is equal to or less than a total input bit rate, and decode video information from multiple video streams each having different video layers with different levels of spatial resolution, temporal resolution and quality for two or more display objects. Other embodiments are described and claimed.

20 Claims, 12 Drawing Sheets

(56) References Cited

U.S. PATENT DOCUMENTS

| | | |
|---|---|---|
| 6,104,705 A | 8/2000 | Ismail et al. |
| 6,496,217 B1 | 12/2002 | Piotrowski |
| 6,526,177 B1 | 2/2003 | Haskell et al. |
| 6,639,943 B1 | 10/2003 | Radha et al. |
| 6,747,991 B1 | 6/2004 | Hemy et al. |
| 7,007,098 B1 | 2/2006 | Smyth et al. |
| 2003/0076858 A1 | 4/2003 | Deshpande |
| 2003/0165274 A1* | 9/2003 | Haskell et al. ............... 382/243 |
| 2005/0094726 A1 | 5/2005 | Park |
| 2005/0099492 A1 | 5/2005 | Orr |
| 2006/0072661 A1 | 4/2006 | Kim et al. |
| 2006/0078049 A1 | 4/2006 | Bao et al. |
| 2006/0092269 A1 | 5/2006 | Baird et al. |
| 2006/0165302 A1 | 7/2006 | Han et al. |
| 2006/0179147 A1 | 8/2006 | Tran et al. |
| 2006/0206560 A1 | 9/2006 | Kanada |
| 2006/0212542 A1 | 9/2006 | Fang et al. |
| 2007/0165820 A1 | 7/2007 | Krantz et al. |
| 2008/0043644 A1 | 2/2008 | Barkley et al. |
| 2008/0043832 A1* | 2/2008 | Barkley et al. ............... 375/240 |
| 2008/0158339 A1 | 7/2008 | Civanlar et al. |

FOREIGN PATENT DOCUMENTS

| | | |
|---|---|---|
| GB | 2384932 | 8/2003 |
| JP | H06-098308 | 4/1994 |
| JP | H09-046680 | 2/1997 |
| JP | 2001-258004 | 9/2001 |
| JP | 2004-140667 | 5/2004 |
| JP | 2005204157 | 7/2005 |
| JP | 2005341076 | 12/2005 |
| WO | 03065720 | 8/2003 |
| WO | 2004056112 | 7/2004 |
| WO | 2008082375 | 7/2008 |

OTHER PUBLICATIONS

Eleftheriadis et al., "Multipoint videoconferencing with scalable video coding", J. of Zhejiang University Science A, vol. 7, No. 5, May 1, 2006, 10 pages.

McCanne, et al.,"Receiver-driven Layered Multicast", Computer Communication Review, ACM, No. 4, Oct. 1, 1996, 14 pages.

Wu et al; "A Framework for Efficient Progressive Fine Granularity Scalable Video Coding"; IEEE Transactions on Circuits and Systems for Video Technology, vol. 11 No. 3, pp. 332-344, Mar. 2001.

Zhu et al; "Scalable Protection for MPEG-4 Fine Granularity Scalability"; IEEE Transactions on Multimedia; vol. 7 No. 2; pp. 222-233, Apr. 2005.

"ITU-T, White Book; audio visual/multimedia relevant (Hseries) recommendation report," pp. 380, 497, and 498, The ITU Association of Japan, Feb. 18,1995 (author unknown).

Kodama, et al., "review of moving image information transformation describing method in MSP communication service," Technical Report of IEICE, vol. 98, No. 681, pp. 59-64, The Institute of Electronics, Information and Communication Engineers, Mar. 19, 1999.

Wenger et al., "RTP Payload Format for H.264/SVC scalable video coding", J. of Zhejiang University Science A; An International Applied Physics and Engineering Journal, Springer, Berlin, DE, vol. 7, No. 5, May 1, 2006, pp. 657-667.

Wenger et al., "RTP Payload Format for SVC Video; draft-wenger-avt-rtp-sc-02.txt", No. 2, Jun. 1, 2006 XP015045247, ISSN :0000-0004, 30 pages.

Wenger et al., "RTP Payload Format for H.264 Video; rfc3984.txt", Feb. 1, 2005, XP015009755, ISSN:000-0003, 84 pages.

* cited by examiner

200

Temporal and Spatial Scalability Framework

Video Transmission Time At T0 + dt

Video Transmission Time At Steady State

TECHNIQUES FOR MANAGING VISUAL COMPOSITIONS FOR A MULTIMEDIA CONFERENCE CALL

CROSS-REFERENCE TO RELATED APPLICATION

The application is a continuation of, claims the benefit of and priority to, previously filed U.S. patent application Ser. No. 11/511,749 entitled "Techniques for Managing Visual Compositions for a Multimedia Conference Call" filed on Aug. 29, 2006, the subject matter of which is hereby incorporated by reference in its entirety.

BACKGROUND

Multimedia conference calls typically involve communicating voice, video, and/or data information between multiple endpoints. With the proliferation of data networks, multimedia conferencing is migrating from traditional circuit-switched networks to packet networks. To establish a multimedia conference call over a packet network, a conferencing server typically operates to coordinate and manage the conference call. The conferencing server receives a video stream from a sending participant and multicasts the video stream to other participants in the conference call.

One problem associated with communicating multimedia information such as digital video for a video conference call is that digital video (sometimes combined with embedded digital audio) often consumes large amounts of storage and transmission capacity. A typical raw digital video sequence includes 15, 30 or even 60 frames per second (frame/s). Each frame can include hundreds of thousands of pixels. Each pixel or pel represents a tiny element of the picture. In raw form, a computer commonly represents a pixel with 24 bits, for example. Thus a bit rate or number of bits per second of a typical raw digital video sequence can be on the order of 5 million bits per second (bit/s) or more. Most media processing devices and communication networks lack the resources to process raw digital video. For this reason, media communication systems use source compression (also called coding or encoding) to reduce the bit rate of digital video. Decompression (or decoding) reverses compression.

Typically there are design tradeoffs in selecting a particular type of video compression for a given processing device and/or communication network. For example, compression can be lossless where the quality of the video remains high at the cost of a higher bit rate, or lossy where the quality of the video suffers but decreases in bit rate are more dramatic. Most system designs make some compromises between quality and bit rate based on a given set of design constraints and performance requirements. Consequently, a given video compression technique is typically not suitable for different types of media processing devices and/or communication networks. This may be particularly problematic when one or more receiving devices utilize multiple display frames, windows or other objects to display video information for different participants in a multimedia conference call. This is further exacerbated when different participants appear in different display windows to accommodate different sets of speakers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments are generally directed to digital encoding, decoding and processing of digital media content, such as video, images, pictures, and so forth. In some embodiments, the digital encoding, decoding and processing of digital media content may be based on the Society of Motion Picture and Television Engineers (SMPTE) standard 421M ("VC-1") video codec series of standards and variants. More particularly, some embodiments are directed to multiple resolution video encoding and decoding techniques and how such techniques are enabled in the VC-1 bitstream without breaking backward compatibility. In one embodiment, for example, an apparatus may include a video encoder arranged to compress or encode digital video information into an augmented SMPTE VC-1 video stream or bitstream. The video encoder may encode the digital video information in the form of multiple layers, such as a base layer and one or more spatial and/or temporal enhancement layers. The base layer may offer a defined minimum degree of spatial resolution and a base level of temporal resolution. One or more enhancement layers may include encoded video information that may be used to increase the base level of spatial resolution and/or the base level of temporal resolution for the video information encoded into the base layer.

In various embodiments, a video decoder may selectively decode video information from the base layer and one or more enhancement layers to playback or reproduce the video information at a desired level of quality. Likewise, an Audio Video Multipoint Control Unit (AVMCU) may select to forward video information from the base layer and one or more enhancement layers to a conference participant based on information such as network bandwidth currently available and receiver's decoding capability.

In some embodiments in particular, a video decoder may be arranged to selectively decode video information from the base layer and one or more enhancement layers of the video stream in order to playback or reproduce the video information at varying levels of video resolution and quality for a visual composition used for a conference call. A visual composition typically includes multiple display objects, such as display windows, each displaying video information for different participants in a conference call. In one embodiment, for example, a client such as a receiving client terminal may include a processing system, memory and a display. The processing system may include a processor arranged to allocate a display object bit rate for multiple display objects for a visual composition for a conference call. The allocations may be made where a total display object bit rate for all display objects is equal to or less than a total input bit rate for a client, such as a client terminal. The client terminal may then send a subscription request for different video layers each with different levels of spatial resolution, temporal resolution and quality for two or more display objects based on the allocations to the conferencing server or sending client terminals. In this manner, the client terminal may make efficient use of its input bit rate budget. Alternatively, the client terminal may receive scalable video streams, and the video decoder may decode the appropriate video information from the different video layers of the video streams. In this manner, the client terminal may make efficient use of its computational resources. A rendering module (e.g., a display chipset) may be arranged to render said decoded video information in each display frame to create a visual composition for a conference call on said display.

Various embodiments may also be directed to adaptive scheduling techniques for a conferencing server or AVMCU. An apparatus may include a receiver arranged to receive encoded video information in multiple video streams each having different video layers including a base layer having a first level of spatial resolution and a first level of temporal resolution, and an enhancement layer increasing the first level of spatial resolution or the first level of temporal resolution. The apparatus may further include an adaptive scheduling module coupled to the receiver. The adaptive scheduling module may be arranged to transmit the different video layers at different times to a receiving client terminal in response to changes in a dominant or active speaker in a conference call. Other embodiments are described and claimed.

DETAILED DESCRIPTION

Figure 1:
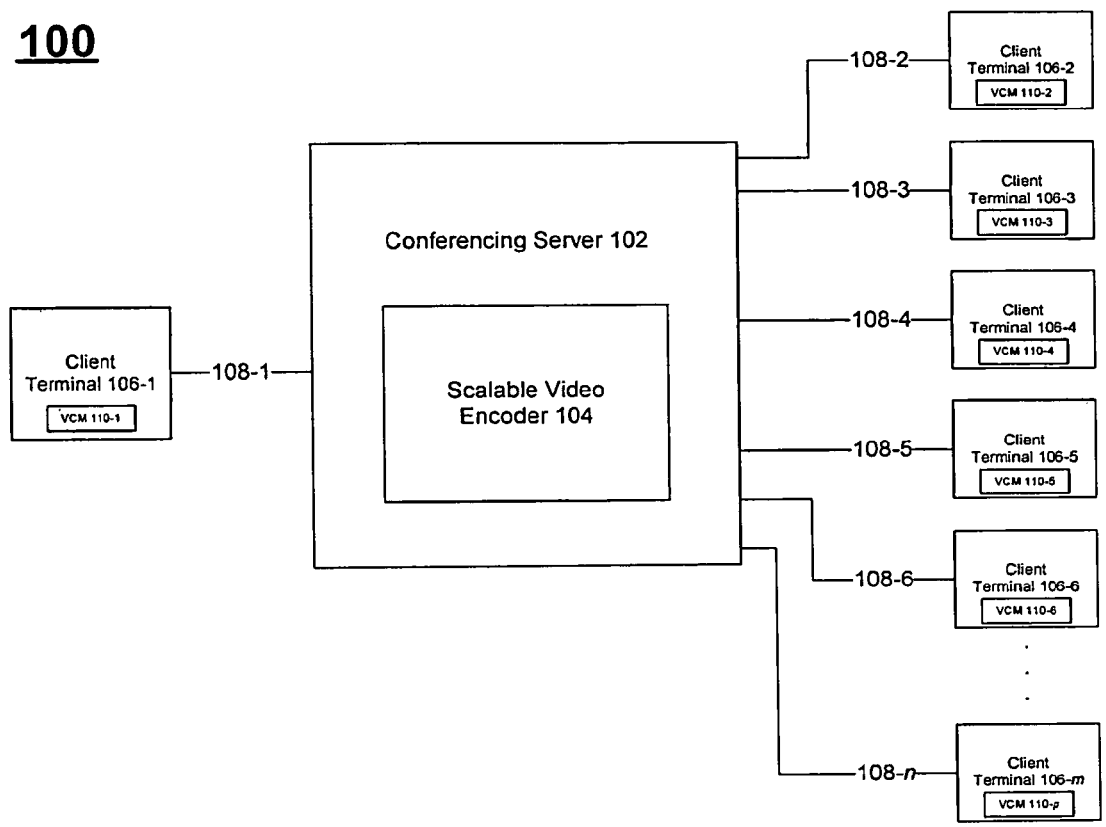
FIG. 1 illustrates an embodiment for a multimedia conference system.

Various embodiments may be directed to managing visual compositions for a multimedia conference call. In a multi-party video conference, each receiving client terminal receives a video stream from each of the other client terminals participating in a conference call, as well as emitting a video stream of its own. A receiving client terminal may arrange the multiple video streams from the other receiving client terminals on a display screen in the form of a visual composition. A visual composition renders or displays video streams from all or a subset of the participants as a mosaic on a display device for a given client terminal. For example, a visual composition may have a top display object to display video information for a current active speaker, and a panoramic view of the other participants may be displayed by a smaller set of display objects positioned beneath the top display object.

Each visual composition has different communication requirements. For example, smaller display objects and picture-in-picture displays may have lower spatial resolution requirements than larger display objects. Similarly, video information for the less active participants may have lower temporal resolution requirements than the videos of the more active participants. Lower spatial and/or temporal resolutions generally have lower bit rates for a given picture quality, often measured in terms of signal-to-noise ratio (SNR) or other metric. For a given spatio-temporal resolution, lower picture quality typically has a lower bit rate, while higher picture quality typically has a higher bit rate. Some visual compositions may have lower picture quality requirements for some or all of the participants.

Each client terminal typically has an overall input bit rate budget, or constraint, as well as an overall output bit rate budget. Consequently, one design goal is to efficiently utilize the input bit rate and output bit rate budgets. Accordingly, various embodiments may implement a scalable video representation to improve utilization and efficiency for the overall input bit rate budget and/or output bit rate budget for a given client terminal to render or display a visual composition for a multimedia conference call. The availability of multiple spatial resolutions, temporal resolutions, and quality levels for each video stream allows a client terminal to make efficient use of its input bit rate budget for any given composition, by selectively receiving and/or decoding only the video information needed for the visual composition.

In various embodiments, a visual composition module may be implemented at a client terminal, a conferencing server, or any other device used in a conference call. The visual composition module may receive all or a portion of the scalable video stream and perform scaled decoding and visual composition display operations accordingly. In various embodiments, the visual composition module may receive a total input bit rate for multiple display objects of a given client terminal. Once the visual composition module receives the total input bit rate budget for the client terminal, the visual composition module may dynamically allocate a display object bit rate to each display object used for a visual composition at the client terminal. The visual composition module may allocate a display object bit rate to a given display object based on any number of factors as described below. In some embodiments, for example, the visual composition module may allocate display object bit rates based on a display object size, a display object location, and an instantaneous channel capacity for a given communications link or media channel.

During allocation operations, the visual composition module limits display object bit rate allocations to a total display object bit rate for all display objects that is equal to or less than the total input bit rate for the client terminal. Visual composition module may dynamically vary display object bit rate allocations based on changing conditions, such as changes in active speaker, changes in display object size, changes in an amount of motion for video information in a given display object, change in status (paused video or streaming video) and so forth. Visual composition module may output the display object bit rate allocations to a scalable video decoder capable of decoding scaled video information from the scaled video encoder. The scalable video decoder may receive the display object bit rate allocations from visual composition module, and initiate scalable decoding operations to decode video information from the different video layers for each display object in accordance with its display object bit rate allocation. For a given set of video information and display object, scalable video decoder may decode varying levels of spatial resolution, temporal resolution and quality. Alternatively, the visual composition module may send a subscription message to the conferencing server requesting different video layers with the desired level of resolution and quality for each display object in the visual composition. In this manner, a scalable video encoder/decoder and/or visual composition module may improve efficient use of input bit rates for a given client terminal when rendering a visual composition with multiple display objects corresponding to multiple participants in a multimedia conference call.

Various embodiments may also be directed to adaptive scheduling techniques for a multimedia conference call. When a new dominant or active speaker starts talking from a given sending client terminal, a conferencing server or AVMCU may send a key frame request for a new video key frame so any receiving client terminals can start rendering a display object with the new dominant speaker. A key frame, however, is relatively large and therefore takes a greater amount of time to transmit relative to other video frames. As a result, video latency is higher and it takes several seconds before the participant can see the new dominant speaker.

Various embodiments may solve these and other problems using an adaptive scheduling module. The adaptive scheduling module may be arranged to allow adaptive scheduling of the transmission of the video layers in time on behalf of another device, such as a sending client terminal. As a result, response time may be improved when a dominant or active speaker starts talking and sending his/her video. The lower video layers are transmitted first and additional layers are gradually transmitted to improve the video quality over time. In this manner, a visual composition may be rendered which smoothly transitions from one spatial or temporal resolution to a finer one when a new dominant speaker begins speaking, thereby activating a switch in display objects to show video information for the new dominant speaker. Adaptively scheduling the transmission of video layers may reduce flicker, blanking, and other side effects introduced by the transition between dominant speakers and corresponding display objects in the visual composition.

Multimedia Conferencing System

FIG. 1 illustrates a block diagram for a multimedia conferencing system 100. Multimedia conferencing system 100 may represent a general system architecture suitable for implementing various embodiments. Multimedia conferencing system 100 may comprise multiple elements. An element may comprise any physical or logical structure arranged to perform certain operations. Each element may be implemented as hardware, software, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof. Although multimedia conferencing system 100 as shown in FIG. 1 has a limited number of elements in a certain topology, it may be appreciated that multimedia conferencing system 100 may include more or less elements in alternate topologies as desired for a given implementation. The embodiments are not limited in this context.

In various embodiments, multimedia conferencing system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a device to process the media information in a predetermined manner, and so forth. It is noted that while some embodiments may be described specifically in the context of selectively removing video frames from video information to reduce video bit rates, various embodiments encompasses the use of any type of desired media information, such as pictures, images, data, voice, music or any combination thereof.

In various embodiments, multimedia conferencing system 100 may include a conferencing server 102. Conferencing server 102 may comprise any logical or physical entity that is arranged to manage or control a multimedia conference call between client terminals 106-1-$m$, where m represents the number of terminals in the conference. In various embodiments, conferencing server 102 may comprise, or be implemented as, a processing or computing device, such as a computer, a server, a router, a switch, a bridge, and so forth. A specific implementation for conferencing server 102 may vary depending upon a set of communication protocols or standards to be used for conferencing server 102. In one example, conferencing server 102 may be implemented in accordance with the International Telecommunication Union (ITU) H.323 series of standards and/or variants. The H.323 standard defines a multipoint control unit (MCU) to coordinate conference call operations. In particular, the MCU includes a multipoint controller (MC) that handles H.245 signaling, and one or more multipoint processors (MP) to mix and process the data streams. In another example, conferencing server 102 may be implemented in accordance with the Internet Engineering Task Force (IETF) Multiparty Multimedia Session Control (MMUSIC) Working Group Session Initiation Protocol (SIP) series of standards and/or variants. SIP is a proposed standard for initiating, modifying, and terminating an interactive user session that involves multimedia elements such as video, voice, instant messaging, online games, and virtual reality. Both the H.323 and SIP standards are essentially signaling protocols for Voice over Internet Protocol (VoIP) or Voice Over Packet (VOP) multimedia conference call operations. It may be appreciated that other signaling protocols may be implemented for conferencing server 102, however, and still fall within the scope of the embodiments. The embodiments are not limited in this context.

In various embodiments, multimedia conferencing system 100 may include one or more client terminals 106-1-$m$ to connect to conferencing server 102 over one or more communications links 108-1-$n$, where m and n represent positive integers that do not necessarily need to match. For example, a client application may host several client terminals each representing a separate conference at the same time. Similarly, a client application may receive multiple media streams. For example, video streams from all or a subset of the participants may be displayed as a mosaic on the participant's display with a top window with video for the current active speaker, and a panoramic view of the other participants in other windows. Client terminals 106-1-*m* may comprise any logical or physical entity that is arranged to participate or engage in a multimedia conference call managed by conferencing server 102. Client terminals 106-1-*m* may be implemented as any device that includes, in its most basic form, a processing system including a processor and memory (e.g., memory units 110-1-*p*), one or more multimedia input/output (I/O) components, and a wireless and/or wired network connection. Examples of multimedia I/O components may include audio I/O components (e.g., microphones, speakers), video I/O components (e.g., video camera, display), tactile (I/O) components (e.g., vibrators), user data (I/O) components (e.g., keyboard, thumb board, keypad, touch screen), and so forth. Examples of client terminals 106-1-*m* may include a telephone, a VoIP or VOP telephone, a packet telephone designed to operate on a Packet Switched Telephone Network (PSTN), an Internet telephone, a video telephone, a cellular telephone, a personal digital assistant (PDA), a combination cellular telephone and PDA, a mobile computing device, a smart phone, a one-way pager, a two-way pager, a messaging device, a computer, a personal computer (PC), a desktop computer, a laptop computer, a notebook computer, a handheld computer, a network appliance, and so forth. The embodiments are not limited in this context.

Depending on a mode of operation, client terminals 106-1-*m* may be referred to as sending client terminals or receiving client terminals. For example, a given client terminal 106-1-*m* may be referred to as a sending client terminal when operating to send a video stream to conferencing server 102. In another example, a given client terminal 106-1-*m* may be referred to as a receiving client terminal when operating to receive a video stream from conferencing server 102, such as a video stream from a sending client terminal, for example. In the various embodiments described below, client terminal 106-1 is described as a sending client terminal, while client terminals 106-2-*m* are described as receiving client terminals, by way of example only. Any of client terminals 106-1-*m* may operate as a sending or receiving client terminal throughout the course of a conference call, and frequently shift between modes at various points in the conference call. The embodiments are not limited in this respect.

In various embodiments, multimedia conferencing system 100 may comprise, or form part of, a wired communications system, a wireless communications system, or a combination of both. For example, multimedia conferencing system 100 may include one or more elements arranged to communicate information over one or more types of wired communications links. Examples of a wired communications link may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. Multimedia conferencing system 100 also may include one or more elements arranged to communicate information over one or more types of wireless communications links. Examples of a wireless communications link may include, without limitation, a radio channel, infrared channel, radio-frequency (RF) channel, Wireless Fidelity (WiFi) channel, a portion of the RF spectrum, and/or one or more licensed or license-free frequency bands.

Multimedia conferencing system 100 also may be arranged to operate in accordance with various standards and/or protocols for media processing. Examples of media processing standards include, without limitation, the Society of Motion Picture and Television Engineers (SMPTE) 421M ("VC-1") series of standards and variants, VC-1 implemented as MICROSOFT® WINDOWS® MEDIA VIDEO version 9 (WMV-9) series of standards and variants, Digital Video Broadcasting Terrestrial (DVB-T) broadcasting standard, the ITU/IEC H.263 standard, Video Coding for Low Bit rate Communication, ITU-T Recommendation H.263v3, published November 2000 and/or the ITU/IEC H.264 standard, Video Coding for Very Low Bit rate Communication, ITU-T Recommendation H.264, published May 2003, Motion Picture Experts Group (MPEG) standards (e.g., MPEG-1, MPEG-2, MPEG-4), and/or High performance radio Local Area Network (HiperLAN) standards. Examples of media processing protocols include, without limitation, Session Description Protocol (SDP), Real Time Streaming Protocol (RTSP), Real-time Transport Protocol (RTP), Synchronized Multimedia Integration Language (SMIL) protocol, and/or Internet Streaming Media Alliance (ISMA) protocol. The embodiments are not limited in this context.

In one embodiment, for example, conferencing server 102 and client terminals 106-1-*m* of multimedia conferencing system 100 may be implemented as part of an H.323 system operating in accordance with one or more of the H.323 series of standards and/or variants. H.323 is an ITU standard that provides specification for computers, equipment, and services for multimedia communication over networks that do not provide a guaranteed quality of service. H.323 computers and equipment can carry real-time video, audio, and data, or any combination of these elements. This standard is based on the IETF RTP and RTCP protocols, with additional protocols for call signaling, and data and audiovisual communications. H.323 defines how audio and video information is formatted and packaged for transmission over the network. Standard audio and video coders/decoders (codecs) encode and decode input/output from audio and video sources for communication between nodes. A codec converts audio or video signals between analog and digital forms. In addition, H.323 specifies T.120 services for data communications and conferencing within and next to an H.323 session. The T.120 support services means that data handling can occur either in conjunction with H.323 audio and video, or separately, as desired for a given implementation.

In accordance with a typical H.323 system, conferencing server 102 may be implemented as an MCU coupled to an H.323 gateway, an H.323 gatekeeper, one or more H.323 terminals 106-1-*m*, and a plurality of other devices such as personal computers, servers and other network devices (e.g., over a local area network). The H.323 devices may be implemented in compliance with the H.323 series of standards or variants. H.323 client terminals 106-1-*m* are each considered "endpoints" as may be further discussed below. The H.323 endpoints support H.245 control signaling for negotiation of media channel usage, Q.931 (H.225.0) for call signaling and call setup, H.225.0 Registration, Admission, and Status (RAS), and RTP/RTCP for sequencing audio and video packets. The H.323 endpoints may further implement various audio and video codecs, T.120 data conferencing protocols and certain MCU capabilities. Although some embodiments may be described in the context of an H.323 system by way of example only, it may be appreciated that multimedia conferencing system 100 may also be implemented in accordance with one or more of the IETF SIP series of standards and/or variants, as well as other multimedia signaling standards, and still fall within the scope of the embodiments. The embodiments are not limited in this context.

In general operation, multimedia conference system 100 may be used for multimedia conference calls. Multimedia conference calls typically involve communicating voice, video, and/or data information between multiple end points. For example, a public or private packet network may be used for audio conferencing calls, video conferencing calls, audio/video conferencing calls, collaborative document sharing and editing, and so forth. The packet network may also be connected to the PSTN via one or more suitable VoIP gateways arranged to convert between circuit-switched information and packet information. To establish a multimedia conference call over a packet network, each client terminal 106-1-m may connect to conferencing server 102 using various types of wired or wireless communications links 108-1-n operating at varying connection speeds or bandwidths, such as a lower bandwidth PSTN telephone connection, a medium bandwidth DSL modem connection or cable modem connection, and a higher bandwidth intranet connection over a local area network (LAN), for example.

In a multiparty video conference, each receiving client terminal 106-2-m receives a video stream from each of the other client terminals participating in a conference call, as well as emitting a video stream of its own. A receiving client terminal 106-2-m may arrange the multiple video streams from the other receiving client terminals 106-2-m on a display screen in the form of a visual composition. This may be accomplished, for example, using a visual composition module 110-1-p implemented as part of client terminals 106-1-m, respectively. A representative example of a visual composition may be described with reference to FIG. 2.

Figure 2:
FIG. 2 illustrates an embodiment for a visual composition.

FIG. 2 illustrates an exemplary embodiment of a visual composition. FIG. 2 illustrates a visual composition 200 having video streams from all or a subset of the participants displayed as a mosaic on a display for a given client terminal 106-1-m. As shown in FIG. 2, a top display object may comprise a display window arranged to display video information for a current active speaker, and a panoramic view of the other participants may be displayed by a smaller set of display objects positioned beneath the top display object. As the active speaker changes to one of the participants displayed in one of the smaller set of display objects, the video information for the active speaker from one of the smaller set of display objects may be displayed in the top display object, and vice-versa. It may be appreciated that visual composition 200 is only one example of a visual composition, and other visual compositions may be used with a different number of display objects and different sizes of display objects as desired for a given implementation or particular conference call. For example, the display objects may be implemented as "head-and-shoulder" cutouts (e.g., with or without any background), transparent objects that can overlay other objects, rectangular regions in perspective, and so forth. The embodiments are not limited in this context.

As shown in FIG. 2, visual composition 200 may include a main window containing the currently active speaker, multiple smaller windows of the other participants, and perhaps other elements such as a small picture-in-picture or semi-transparent overlay of a recently active speaker within the main window. Furthermore, the visual composition may be dynamic. Since the active speaker may change, other participants in the conference call may rotate through the main window and picture-in-picture. In some cases, not all participants may be visible all the time. The set of visible participants may change in time.

In some embodiments, a visual composition may involve more than one conference. A participant may desire to have each conference call arranged appropriately, according to their relationships to each other and their relative importance. In principle, these conferences could be completely independent of each other. In some cases, however, they would be sub-conferences of a main conference. For example, a secondary conference may be a side chat with another participant in the primary conference.

Each client terminal 106-1-m may choose to construct its own, unique visual composition. Typically there is special treatment for rendering video information for a user of a client terminal 106-1-m as displayed on the client terminal 106-1-m, such as leaving it out of the composition entirely or putting it in a special location.

Each visual composition has different communication requirements. For example, the smaller display objects and picture-in-picture displays may have lower spatial resolution requirements than the larger display objects. Similarly, video information for the less active participants may have lower temporal resolution requirements than the videos of the more active participants.

Spatial resolution may refer generally to a measure of accuracy with respect to the details of the space being measured. In the context of digital video, spatial resolution may be measured or expressed as a number of pixels in a frame, picture or image. For example, a digital image size of 640×480 pixels equals 326,688 individual pixels. In general, images having higher spatial resolution are composed with a greater number of pixels than those of lower spatial resolution. Spatial resolution may affect, among other things, image quality for a video frame, picture, or image.

Temporal resolution may generally refer to the accuracy of a particular measurement with respect to time. In the context of digital video, temporal resolution may be measured or expressed as a frame rate, or a number of frames of video information captured per second, such as 15 frame/s, 30 frame/s, 60 frame/s, and so forth. In general, a higher temporal resolution refers to a greater number of frames/s than those of lower temporal resolution. Temporal resolution may affect, among other things, motion rendition for a sequence of video images or frames. A video stream or bitstream may refer to a continuous sequence of segments (e.g., bits or bytes) representing audio and/or video information.

Lower spatial and/or temporal resolutions generally have lower bit rates for a given picture quality, often measured in terms of a signal-to-noise ratio (SNR) or other metric. For a given spatio-temporal resolution, lower picture quality typically has a lower bit rate, while higher picture quality typically has a higher bit rate. Some visual compositions may have lower picture quality requirements for some or all of the participants.

Each client terminal 106-1-m typically has an overall input bit rate budget, or constraint, as well as an overall output bit rate budget. Consequently, one design goal it to efficiently utilize the input bit rate and output bit rate budgets. Accordingly, various embodiments may implement a scalable video encoder 104 to improve utilization and efficiency for the overall input bit rate budget and/or output bit rate budget for a given client terminal 106-1-m to render or display a visual composition for a multimedia conference call. The availability of multiple spatial resolutions, temporal resolutions, and quality levels for each video stream allows a client terminal 106-1-m to make efficient use of its input bit rate budget for any given composition, by selectively receiving and/or decoding only the video information needed for the visual composition.

In various embodiments, scalable video encoder 104 may be implemented to operate using one or more scalable coding and decoding techniques, sometimes referred to as embedded coding or layered coding. Scalable coding is an efficient way for a transmitter such as conferencing server 102 to produce multiple spatial resolutions, temporal resolutions, and quality levels, and to send these multiple levels while making efficient use of the overall output bit rate budget. In contrast, traditionally, multiple versions of the same video are produced as independent encodings, which are all sent in parallel, a techniques sometimes referred to as "simulcast." Simulcast techniques typically make inefficient use of the overall input bit rate and/or output bit rate budgets. Multimedia conferencing system 100 in general, and scalable video encoders 104 and visual composition modules 110-1-$p$ in particular, may be described with reference to FIG. 3.

Figure 3:
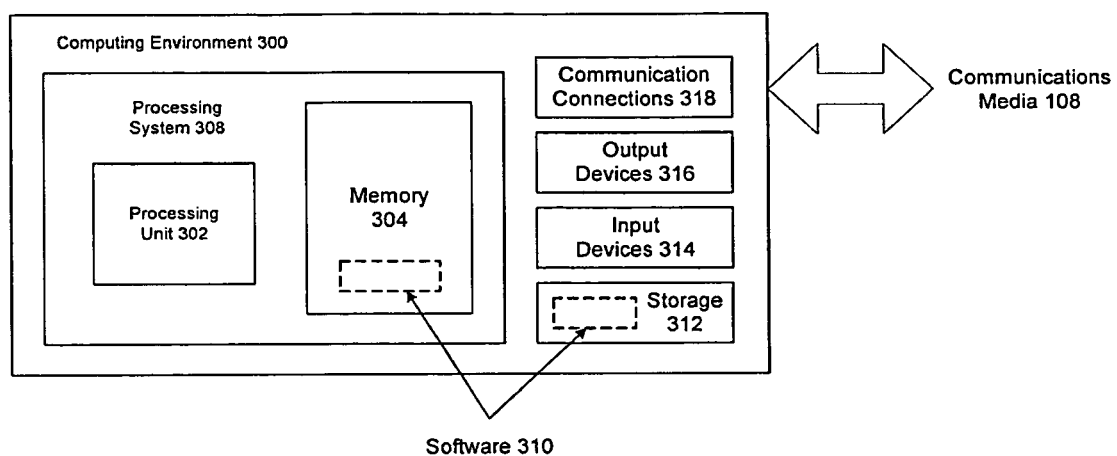
FIG. 3 illustrates an embodiment for a computing environment.

FIG. 3 illustrates a block diagram of computing environment 300. Computing environment 300 may be implemented as a device, or part of a device, such as conferencing server 102 and/or client terminals 106-1-$m$. In some embodiments, computing environment 300 may be implemented to execute software 310. Examples of software 310 may include scalable video encoder 104 and/or visual composition modules 110-1-$p$. For example, when computing environment 300 is implemented as part of conferencing server 102, software programs 310 may include scalable video encoder 104 and/or visual composition modules 110-1-$p$ and accompanying data. In another example, when computing environment 300 is implemented as part of a client terminal 106-1-$m$, software programs 310 may include scalable video encoder 104 and/or visual composition modules 110-1-$p$ and accompanying data. In yet another example, when computing environment 300 is implemented as part of conferencing server 102 and/or client terminal 106-1-$m$, software programs 310 may include an operating system or other system software typically implemented for an electrical, electronic, and/or electro-mechanical device. Although some embodiments may be described with operations for scalable video encoder 104 and/or visual composition modules 110-1-$p$ implemented as software stored and executed by computing environment 300, it may be appreciated that the operations for software modules 104, 110 may be implemented using dedicated hardware, software or any combination thereof. The embodiments are not limited in this context.

In its most basic configuration, computing environment 300 typically includes a processing system 308 that comprises at least one processing unit 302 and memory 304. Processing unit 302 may be any type of processor capable of executing software, such as a general-purpose processor, a dedicated processor, a media processor, a controller, a microcontroller, an embedded processor, a digital signal processor (DSP), and so forth. Memory 304 may be implemented using any machine-readable or computer-readable media capable of storing data, including both volatile and non-volatile memory. For example, memory 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

As shown in FIG. 3, memory 304 may store various software programs 310, such as scalable video encoder 104, visual composition module 110, and accompanying data. In some cases, such as for scalable video encoder 104, software programs 310 may have to be duplicated in the memory if it is designed to handle one media stream at a time. Likewise, processor 302 and scalable video encoder 104 may be duplicated several times if the host system is a multi-core microprocessor-based computing platform. Memory 304 may also store other software programs to implement different aspects of conferencing server 102, such as various types of operating system software, application programs, video codecs, audio codecs, call control software, gatekeeper software, multipoint controllers, multipoint processors, and so forth. Alternatively such operations may be implemented in the form of dedicated hardware (e.g., DSP, ASIC, FPGA, and so forth) or a combination of hardware, firmware and/or software as desired for a given implementation. The embodiments are not limited in this context.

Computing environment 300 may also have additional features and/or functionality beyond configuration 308. For example, computing environment 300 may include storage 312, which may comprise various types of removable or non-removable storage units. Storage 312 may implement using any of the various types of machine-readable or computer-readable media as previously described. Computing environment 300 may also have one or more input devices 314 such as a keyboard, mouse, pen, voice input device, touch input device, and so forth. One or more output devices 316 such as a display device, speakers, printer, and so forth may also be included in computing environment 300 as well.

Computing environment 300 may further include one or more communications connections 318 that allow computing environment 300 to communicate with other devices via communication links 108-1-$n$. Communications connections 318 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes both wired communications media and wireless communications media, as previously described. The terms machine-readable media and computer-readable media as used herein are meant to include both storage media and communications media.

In various embodiments, computing environment 300 may be implemented as some or all of client terminals 106-1-$m$. In particular, computing environment 300 may be implemented with software programs 310 to include one or more visual composition modules 110-1-$p$. In a multiparty video conference, each receiving client terminal 106-1-$m$ receives a video stream from each of the other client terminals participating in a conference call, as well as emitting a video stream of its own. For a given client terminal 106-1-$m$, visual composition modules 110-1-$p$ may arrange the multiple video streams from the other client terminals 106-1-$m$ in a visual composition on a display screen, such as visual composition 200, for example.

In various embodiments, each visual composition has different communication requirements. For example, the smaller display objects and picture-in-picture displays may have lower spatial resolution requirements than the larger display objects. Similarly, video information for the less active participants may have lower temporal resolution requirements than the videos of the more active participants. Lower spatial and/or temporal resolutions generally have lower bit rates for a given picture quality, often measured in terms of a SNR or other metric. For a given spatio-temporal resolution, lower picture quality typically has a lower bit rate, while higher picture quality typically has a higher bit rate. Some visual compositions may have lower picture quality requirements for some or all of the participants.

Each client terminal 106-1-*m* typically has an overall input bit rate budget, or constraint, as well as an overall output bit rate budget. Consequently, one design goal is to efficiently utilize the input bit rate and output bit rate budgets. Various embodiments may implement a scalable video encoder 104 at conferencing server 102 or various client terminals 106-1-*m* to improve utilization and efficiency for the overall input bit rate budget and/or output bit rate budget for a given client terminal 106-1-*m* to render or display a visual composition for a multimedia conference call. The availability of multiple spatial resolutions, temporal resolutions, and quality levels for each video stream allows a client terminal 106-1-*m* to make efficient use of its input bit rate budget for any given visual composition, by selectively receiving and/or decoding only the video information needed for the various display objects within the visual composition. Client terminals 106-1-*m* and corresponding visual composition modules 110-1-*p* may be further described with reference to FIG. 4.

Figure 4:
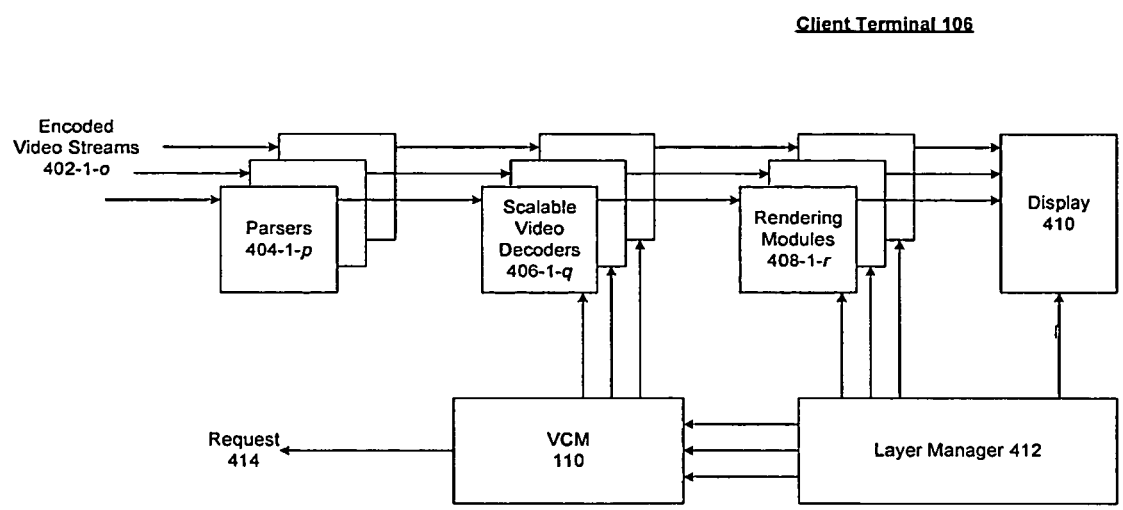
FIG. 4 illustrates an embodiment for a client terminal.

FIG. 4 illustrates an embodiment for a representative client terminal. FIG. 4 provides a more detailed block diagram of a client terminal representative of any one of client terminals 106-1-*m*. As shown in FIG. 4, a client terminal 106 may comprise a wired or wireless parser 404-1-*p* arranged to receive as input one or more encoded video streams 402-1-*o*. In one embodiment, for example, encoded video streams 402-1-*o* may be generated by scalable video encoder 104 implemented as part of conferencing server 102. Encoded video streams 402-1-*o* may include video information encoded with different video layers. Each video layer may have different levels of spatial resolution, temporal resolution and quality. Scalable video encoder 104 may multiplex the various video layers into encoded video streams 402-1-*o*, and transmit video streams 402-1-*o* over communication link 108 via one or more communication connections 318. Scalable video encoder 104 and encoded video streams 402-1-*o* may be described in more detail with reference to FIGS. 6-9 further below.

In various embodiments, encoded video streams 402-1-*o* may be received by one or more parsers 404-1-*p*. Parsers 404-1-*p* may output the received video streams 402-1-*o* to one or more scalable video decoders 406-1-*r* each communicatively coupled to parsers 404-1-*p*. Parsers 404-1-*p* may also output received video streams 402-1-*o* and/or scalability indicators to visual composition module 110, also communicatively coupled to parsers 404-1-*p*.

In various embodiments, visual composition module 110 may receive video streams 402-1-*o* and/or scalable indicators from parser 404-1-*p*. In both cases, visual composition module 110 may use video streams 402-1-*o* or the scalability indicators to determine whether video streams 402-1-*o* contain different video layers with different levels of spatial resolution, temporal resolution, and/or quality. If examination of video streams 402-1-*o* or a value for the scalability indicator indicates an unscalable video stream, then video decoders 406-1-*q* may perform decoding and visual composition display operations as normal. If visual composition module 110 determines that video streams 402-1-*o* are scalable video streams, then video decoders 406-1-*q* may perform scaled decoding accordingly. In the latter case, how many and which spatial or temporal scales in the video bitstream are decoded is determined by visual composition module 110. In each case, the same visual composition module 110 may be used to coordinate the allocation of spatial, temporal resolution across all composition windows such that overall input bit rate budget or another constraint such as decoding performance is not exceeded.

In one embodiment, for example, visual composition module 110 may receive a total input bit rate for multiple display objects of client terminal 106. The total input bit rate value may be received statically from memory 304, or dynamically from rendering modules 408-1-*r*, a communications interface, a transceiver, an operating system, and so forth. The total input bit rate value may provide an indication as to the total input bit rate budget for client terminal 106. The total input bit rate budget may vary in accordance with a number of factors, such as an instantaneous bandwidth of communication link 108, processing speed of processing unit 302, memory size for memory 304, memory bandwidth (e.g., memory bus speeds, access times, and so forth), user selected quality and resolution criteria, display object size, display object location, amount of motion within a video frame sequence for a display object, coding bit rates, graphics bus speeds, and so forth. Furthermore, the total input bit rate budget may vary over time in response to changing conditions for one or more of these factors.

Once visual composition module 110 receives the total input bit rate budget for client terminal 106, visual composition module 110 may allocate a display object bit rate to each display object used for a visual composition at client terminal 106. Visual composition module 110 may allocate a display object bit rate to a given display object based on any number of factors as previously described with reference to a total input bit rate budget. In some embodiments, for example, visual composition module 110 may allocate display object bit rates based on a display object size, a display object location, and an instantaneous channel capacity for communications link 108.

During allocation operations, visual composition module 110 limits display object bit rate allocations to a total display object bit rate for all display objects that is equal to or less than the total input bit rate for client terminal 106. Visual composition module 110 may dynamically vary display object bit rate allocations based on changing conditions, such as changes in active speaker, changes in display object size, changes in an amount of motion for video information in a given display object, changes in status (paused video or streaming video) and so forth. Visual composition module 110 may output the display object bit rate allocations to scalable video decoders 406-1-*q* communicatively coupled to visual composition module 110.

In various embodiments, client terminal 106 may include a set of scalable video decoders 406-1-*q*, with one video decoder 406 for each video stream 402-1-*o*. Scalable video decoders 406-1-*q* may each comprise a video decoder capable of decoding scaled video information from a respective encoded video streams 402-1-*o*. In general, scalable video decoders 406-1-*q* may correspond to, and use similar scalable decoding algorithms, as matching scalable video encoder 104 implemented with conferencing server 102. In one embodiment, for example, scalable video decoders 406-1-$q$ may each receive the display object bit rate allocations from visual composition module 110, and initiate scalable decoding operations to decode video information from the different video layers for each display object in accordance with its display object bit rate allocation. For a given set of video bitstreams and display objects, scalable video decoders 406-1-$q$ may decode varying levels of spatial resolution, temporal resolution and quality. Scalable video decoders 406-1-$q$ may output the decoded video information to rendering modules 408-1-$r$ communicatively coupled to scalable video decoders 406-1-$q$.

Rendering modules 408-1-$r$ may receive the decoded video information for a given display object from corresponding scalable video decoders 406-1-$q$, and begin rendering operations to render the decoded video information in a display object to create a visual composition for a conference call on a display, such as display 410. Rendering modules 408-1-$r$ may be shared among all bitstream decoders and arranges the display objects according to a preset arrangement or user settings. Examples of rendering modules 408-1-$r$ may include a graphics chipset, a graphics user interface module for an operating system, and so forth. Furthermore, as changes in the visual composition occur either automatically or manually by a user, such as changes in display object size or video information content for a given display object, rendering modules 408-1-$r$ may convey display object change information to visual composition module 110. Alternatively, display object change information may be communicated to visual composition module 110 via an operating system or graphic user interface module. Visual composition module 110 may use the display object change information to vary display object bit rate allocations accordingly. Rendering modules 408-1-$r$ may output display information to one or more display devices, such as display 410, for example. Display 410 may render or display a visual composition similar to visual composition 200 or another visual composition. The visual composition may comprise a mosaic of display objects, with each display object including video information for a different participant in the conference call, including a display object for the participant using client terminal 106.

In various embodiments, rendering modules 408-1-$r$ and/or display 410 may render the decoded video information in accordance with layer information received from layer manager 412, for example. Layer manager 412 may receive user input or default settings for a set of display layout information. The display layout information may comprise information regarding the layout of the display objects in the visual composition, including display object size, display object position, display object number, video resolution preferences for each display object, and so forth. Layer manager 412 may output a spatial resolution parameter and frame rate parameter for each video display object in the video composition to visual composition module 110.

Referring again to visual composition module 110, the spatial resolution and/or frame rate parameters may be received from layer manager 412. Visual composition module 110 combines the spatial resolution and/or frame rate parameters for each video display object to compute an improved spatial and temporal combination for each video stream 402-1-$o$ while not exceeding the prescribed global input bit rate. Visual composition module 110 may also receive various input parameters indicating various types of resource utilization for client terminal 106. For example, if system resources (e.g., computing cycles, memory allocation or bandwidth, and so forth), then visual composition module 110 may modify the scales used for one or more display objects. In another example, visual composition module 110 may receive communication channel bandwidth estimates, and modify the various scales accordingly. The embodiments are not limited in this context.

In some embodiments, a given client terminal 106 may provide signaling to conferencing server 102 to indicate or subscribe to different video layers for a conference call, using a technique referred to as "Receiver-Driven Layered Multicast." This may be desirable, for example, when the total input bit rate budget for a given device (e.g., client terminal 106, conferencing server 102, a node in an overlay network, and so forth) is less than a bandwidth needed for encoded video streams 402-1-$o$. For example, if client terminal 106 had a total input bit rate budget that is less than encoded video streams 402-1-$o$ as generated by scalable coder module 104, then visual composition module 110 of client terminal 106 may send a request 414 to request particular video layers to reduce a total bandwidth for encoded video streams 402-1-$o$ to a bit rate that is equal to or less than the total input bit rate budget for client terminal 106. Request 414 may also comprise a request to conferencing server 102 to send a particular set of spatial and temporal scales for each video input, which may vary over time. Further, request 414 may comprise a subscription message to conferencing server 102 to subscribe to different video layers for a conference call. The embodiments are not limited in this context.

When using subscription messages, various elements of visual composition module 110 may be modified or eliminated. For example, visual composition module 110 may not necessarily need parsers 404-1-$p$. Rather, parsers 404-1-$p$ may be implemented by conferencing server 102. When conferencing server 102 receives the subscription message from a client terminal 106, conferencing server 102 may use parsers 404-1-$p$ to parse the input video streams it receives in order to forward the appropriate video layers to the client terminal 106. In this case, visual composition module 110 implemented by client terminal 106 may bypass or omit parsers 404-1-$p$. The embodiments are not limited in this context.

In some embodiments, conferencing server 102 may use parsers 404-1-$p$ without necessarily receiving subscription messages from a given client terminal 106-1-$m$. In one embodiment, for example, conferencing server 102 may have visual composition profiles for each client terminal 106-1-$m$. Each visual composition profile may store various visual composition parameters regarding the visual composition used by the corresponding client terminal 106-1-$m$ or a given multimedia conference call. For example, the visual composition parameters may include a parameter indicating that a dominant speaker should always be in high-resolution format, while all other speakers (except for a user for the given client terminal 106-1-$m$) should be in low resolution format. The visual composition parameters may be defined by a user of a given client terminal 106-1-$m$, conferencing server 102, a conference call administrator, and so forth. The visual composition parameters may further include default visual composition parameters. The default visual composition parameters may be selected based on a varying number of factors, such as certain characteristics of a given multimedia conference call. Examples of such characteristics may include a number of participants, capabilities information associated with each client terminal 106-1-$m$, the type of media information used for the conference call (e.g., audio, video, audio/video, shared document editing, and so forth), a subscription level, a quality of service level, a priority level, a geographic constraint, bandwidth constraints, and so forth. In this manner, conferencing server 102 may use the visual composition profiles and visual composition parameters to determine a visual composition used by one or more client terminals 106-1-*m*. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
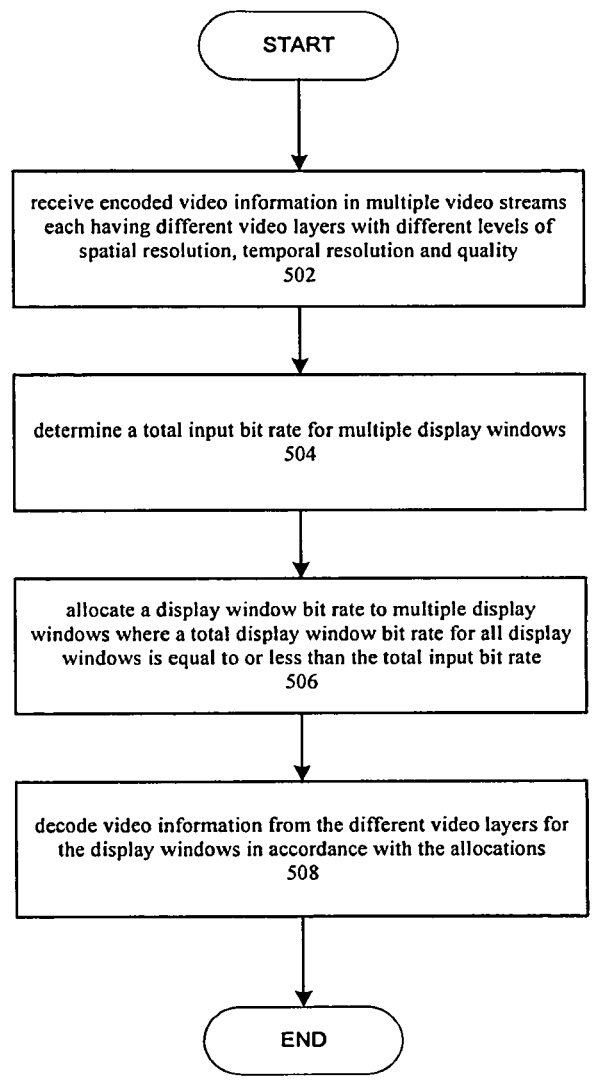
FIG. 5 illustrates an embodiment for a logic flow.

FIG. 5 illustrates one embodiment of a logic flow 500. Logic flow 500 may be representative of the operations executed by one or more embodiments described herein, such as multimedia conferencing system 100, conferencing server 102, scalable video encoder 104, client terminal 106, and/or visual composition module 110. As shown in FIG. 5, encoded video information may be received in multiple video streams each having different video layers with different levels of spatial resolution, temporal resolution and quality at block 502. A total input bit rate for multiple display objects may be determined at block 504. A display object bit rate may be allocated to multiple display objects where a total display object bit rate for all display objects is equal to or less than the total input bit rate at block 506. Video information may be decoded from the different video layers for the display objects in accordance with the display object bit rate allocations at block 508. The decoded video information may be rendered in each display frame to create a visual composition for a conference call. The embodiments are not limited in this context.

In one embodiment, for example, a subscription message may be sent to a conferencing server to subscribe to different video layers for a conference call. The embodiments are not limited in this context.

In one embodiment, for example, a display object bit rate for a display frame may be modified based on a size for a display frame or a location of a display frame on a display. A display object bit rate for a display frame may also be modified based on an instantaneous channel capacity for a communications link. A display object bit rate for a display frame may be further modified based on an active speaker. The embodiments are not limited in this context.

In one embodiment, for example, encoded video information may be received in a video stream with different video layers. Each video layer may include different levels of spatial resolution, temporal resolution and/or quality for a conference call at a client terminal. In one embodiment, for example, the different video layers may include a base layer having a first level of spatial resolution and a first level of temporal resolution, and one or more enhancement layers increasing the first level of spatial resolution or the first level of temporal resolution. The embodiments are not limited in this context.

Scalable Encoding and Decoding

As previously described, various embodiments may implement multiple resolution encoding and decoding techniques. Referring again to FIG. 1, scalable video encoder 104 may be arranged to encode digital video information as multiple video layers within a common video stream, where each video layer offers one or more levels of spatial resolution and/or temporal resolution. As shown in FIG. 1, scalable video encoder 104 may be implemented as part of conferencing server 102. This may be desirable, for example, when one or more client terminals 106-1-*m* are not implemented with scalable video encoding capabilities. As a result, conferencing server 102 may implement scalable video encoding techniques on behalf of the client terminals 106-1-*m* by upsampling or downsampling video information from the various received video streams. In some embodiments, however, scalable video encoder 104 may be implemented in each of client terminals 106-1-*m*. In this case, the scalable video encoding capabilities implemented for conferencing server 102 may be limited to parsing the received video streams to forward the appropriate video layers to client terminals 106-1-*m* in response to the subscription messages, or omitted entirely. The embodiments are not limited in this context.

Scalable video encoder 104 may multiplex digital video information for multiple video layers, such as a base layer and enhancement layers, into a single common video stream. Scalable video decoders 406-1-*q* may be arranged to decode video information encoded by scalable video encoder 104. For example, scalable video decoder may be arranged to demultiplex or selectively decode video information from the common video stream to retrieve video information from the base layer and one or more enhancement layers to playback or reproduce the video information with a desired level of quality, typically defined in terms of a SNR value, for example. Scalable video decoders 406-1-*q* may selectively decode the video information using various start codes as defined for each video layer. Likewise, an AVMCU (e.g., conferencing server 102) may select to forward the base layer and only a subset of the enhancements layer to one or more participants based on information like current bandwidth available and decoder capability. The AVMCU selects the layers using start codes in the video bitstream.

In one embodiment, for example, scalable video encoder 104 may encode digital video information as a base layer and one or more temporal and/or spatial enhancement layers. The base layer may provide a base or minimum level of spatial resolution and/or temporal resolution for the digital video information. The temporal and/or spatial enhancement layers may provide scaled enhanced levels of video spatial resolution and/or level of temporal resolutions for the digital video information. Various types of entry points and start codes may be defined to delineate the different video layers within a video stream. In this manner, a single scalable video encoder may provide and multiplex multiple levels of spatial resolution and/or temporal resolution in a single common video stream (e.g., encoded video streams 402-1-*o*).

In various embodiments, a number of different video decoders may selectively decode digital video information from a given video layer of the encoded video stream to provide a desired level of spatial resolution and/or temporal resolution for a given media processing device. For example, one type of video decoder may be capable of decoding a base layer from a video stream, while another type of video decoder may be capable of decoding a base layer and one or more enhanced layers from a video stream. A media processing device may combine the digital video information decoded from each video layer in various ways to provide different levels of video quality in terms of spatial resolution and/or temporal resolutions. The media processing device may then reproduce the decoded digital video information at the selected level of spatial resolution and temporal resolution on one or more displays.

A scalable or multiple resolution video encoder and decoder may provide several advantages over conventional video encoders and decoders. For example, various scaled or differentiated digital video services may be offered using a single scalable video encoder and one or more types of video decoders. Legacy video decoders may be capable of decoding digital video information from a base layer of a video stream without necessarily having access to the enhancement layers, while enhanced video decoders may be capable of accessing both a base layer and one or more enhanced layers within the same video stream. In another example, different encryption techniques may be used for each layer, thereby controlling access to each layer. Similarly, different digital rights may be assigned to each layer to authorize access to each layer. In yet another example, a level of spatial and/or temporal resolution may be increased or decreased based on a type of video source, a type of video compression technique, a bandwidth or protocol available for a communication link, processing or memory resources available for a given receiving device, a type of display device used to reproduce the digital video, and so forth.

In particular, this improved variable video coding resolution implementation has the advantage of carrying parameters that specify the dimensions of the display resolution within the video stream. Coding resolutions for a portion of the video is signaled at the entry point level. The entry points are adjacent to, or adjoining, one or more subsequences or groups of pictures of the video sequence that begins with an intra-coded frame (also referred to as an "I-frame"), and also may contain one or more predictive-coded frames (also referred to as a "P-frame" or "B-frame") that are predictively coded relative to that intra-coded frame. The coding resolution signaled at a given entry point thus applies to a group of pictures that includes an I-frame at the base layer and the P-frames or B-frames that reference the I-frame.

Various embodiments may be directed to implementations of an improved variable coding resolution technique that permits portions of a video sequence to be variably coded at different resolutions. An exemplary application of this technique is in a video codec system. Accordingly, the variable coding resolution technique is described in the context of an exemplary video encoder/decoder utilizing an encoded bitstream syntax. In particular, one described implementation of the improved variable coding resolution technique is in a video codec that complies with the advanced profile of the SMPTE standard 421M (VC-1) video codec series of standards and variants. Alternatively, the technique can be incorporated in various video codec implementations and standards that may vary in details from the below described exemplary video codec and syntax.

Figure 6:
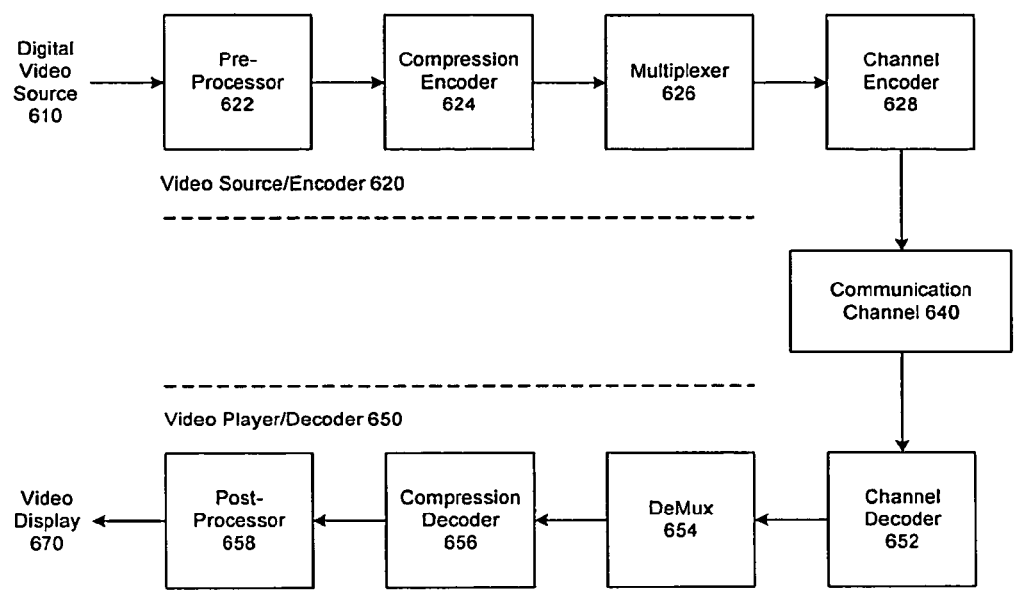
FIG. 6 illustrates an embodiment for a video capture and playback system.

FIG. 6 illustrates an implementation for a video capture and playback system 600. FIG. 6 illustrates the video capture and playback system 600 employing a video codec in which the variable coding resolution technique is implemented in a typical application or use scenario. The video capture and playback system 600 may be implemented with a number of different elements in multimedia conference system 100, such as conferencing server 102 and/or client terminals 106-1-*m*, for example.

The video capture and playback system 600 generally includes a video source/encoder 620 that captures and encodes video content from an input digital video source 610 into a compressed video bitstream on a communication channel 640, and a video player/decoder 650 that receives and decodes the video from the channel and displays the video on a video display 670. Some examples of such systems in which the below described video codec with variable coding resolution can be implemented encompass systems in which the video capture, encoding, decoding and playback are all performed in a single machine, as well as systems in which these operations are performed on separate, geographically distant machines. For example, a digital video recorder, or personal computer with a TV tuner card, can capture a video signal and encode the video to hard drive, as well as read back, decode and display the video from the hard drive on a monitor. As another example, a commercial publisher or broadcaster of video can use a video mastering system incorporating the video encoder to produce a video transmission (e.g., a digital satellite channel, or Web video stream) or a storage device (e.g., a tape or disk) carrying the encoded video, which is then used to distribute the video to user's decoder and playback machines (e.g., personal computer, video player, video receiver, etc.).

In the illustrated system 600, a video source/encoder 620 includes a source pre-processor 622, a source compression encoder 624, a multiplexer 626 and a channel encoder 628. The pre-processor 622 receives uncompressed digital video from a digital video source 610, such as a video camera, analog television capture, or other sources, and processes the video for input to the compression encoder 624. The compression encoder 624, an example of which is the video encoder 700 as described with reference to FIG. 7, performs compression and encoding of the video. The multiplexer 626 packetizes and delivers the resulting compressed video bitstream to the channel encoder 628 for encoding onto the communication channel 640. The communication channel 640 can be a video transmission, such as digital television broadcast, satellite or other over-the-air transmission; or cable, telephone or other wired transmission, and so forth. The communications channel 640 can also be recorded video media, such as a computer hard drive or other storage disk; tape, optical disk (DVD) or other removable recorded medium. The channel encoder 628 encodes the compressed video bitstream into a file container, transmission carrier signal or the like.

At the video player/decoder 650, a channel decoder 652 decodes the compressed video bitstream on the communication channel 640. A demultiplexer 654 demultiplexes and delivers the compressed video bitstream from the channel decoder to a compression decoder 656, an example of which is the video decoder 800 as described with reference to FIG. 8. The compression decoder then decodes and reconstructs the video from the compressed video bitstream. Finally, the post-processor 658 processes the video to be displayed on a video display 670. Examples of post processing operations include de-blocking, de-ringing or other artifact removal, range remapping, color conversion and other like operations.

Figure 7:
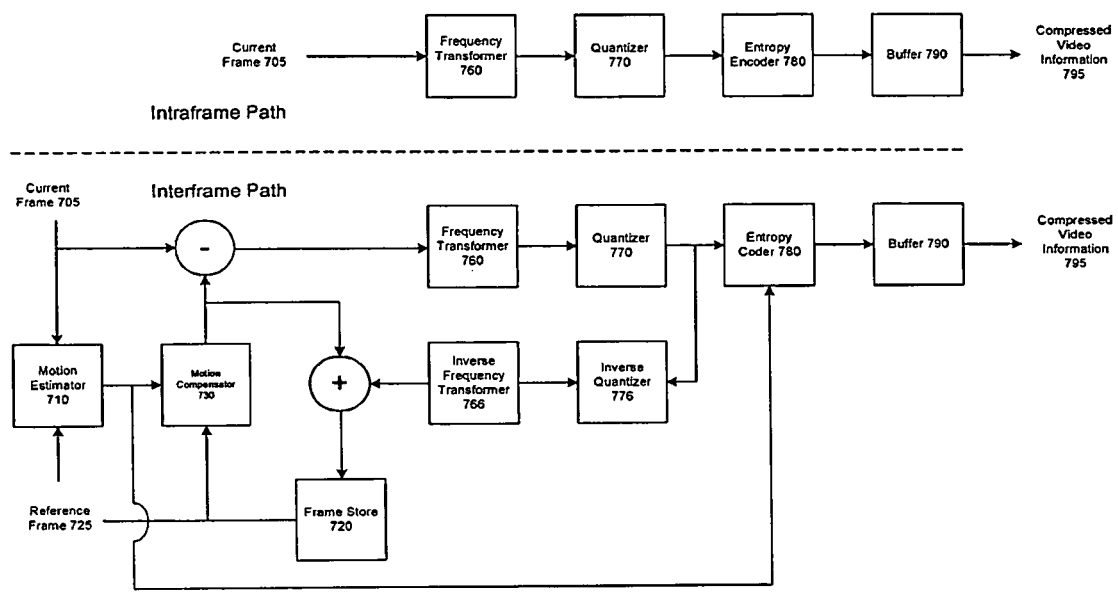
FIG. 7 illustrates an embodiment for a general video encoder system.
Figure 8:
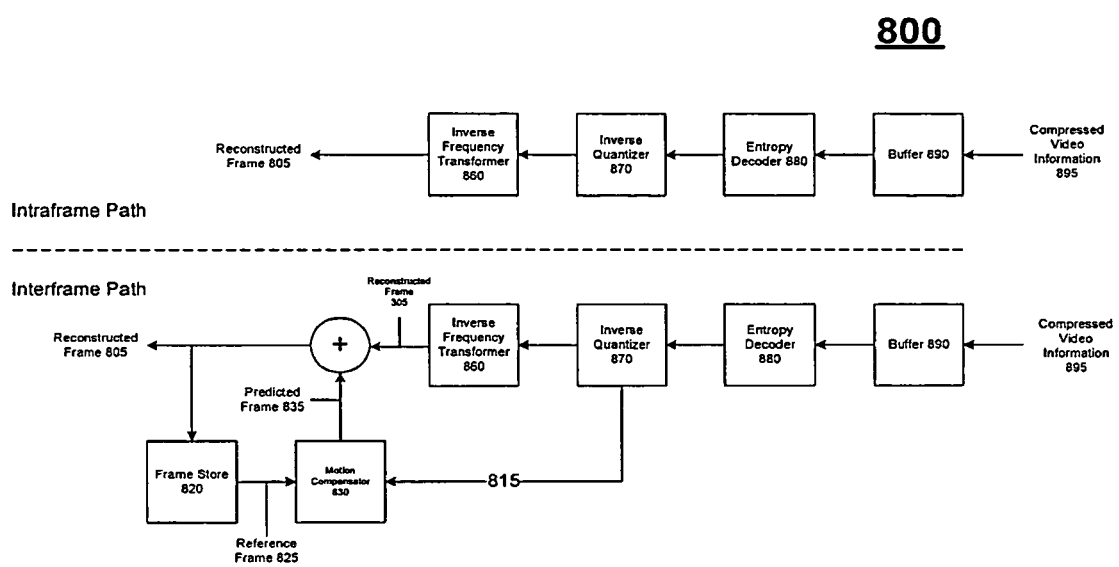
FIG. 8 illustrates an embodiment for a general video decoder system.

FIG. 7 is a block diagram of a generalized video encoder 700, and FIG. 8 is a block diagram of a generalized video decoder 800, in which the variable coding resolution technique can be incorporated. The relationships shown between modules within the encoder and decoder indicate the main flow of information in the encoder and decoder, while other relationships are omitted for the sake of clarity. In particular, FIGS. 7 and 8 usually do not show side information indicating the encoder settings, modes, tables, and so forth, as used for a video sequence, frame, macroblock, block, and so forth. Such side information is sent in the output bitstream, typically after entropy encoding of the side information. The format of the output bitstream can be, for example, a SMPTE VC-1 format, a SMPTE VC-1 format adapted for Real Time Communications, an H.263 format, an H.264 format or other video formats.

In one embodiment, for example, the encoder 700 and decoder 800 are block-based and use a 4:2:0 macroblock format with each macroblock including 4 luminance 8×8 luminance blocks (at times treated as one 16×16 macroblock) and two 8×8 chrominance blocks. Alternatively, the encoder 700 and decoder 800 are object-based, use a different macroblock or block format, or perform operations on sets of pixels of different size or configuration than 8×8 blocks and 16×16 macroblocks. The macroblock may be used to represent either progressive or interlaced video content.

The scalable video encoding and decoding techniques and tools in the various embodiments can be implemented in a video encoder and/or decoder. Video encoders and decoders may contain within them different modules, and the different modules may relate to and communicate with one another in many different ways. The modules and relationships described below are by way of example and not limitation. Depending on implementation and the type of compression desired, modules of the video encoder or video decoder can be added, omitted, split into multiple modules, combined with other modules, and/or replaced with like modules. In alternative embodiments, video encoders or video decoders with different modules and/or other configurations of modules may perform one or more of the described techniques.

In general, video compression techniques include intraframe compression and interframe compression. Intraframe compression techniques compress individual frames, typically called I-frames, key frames, or reference frames. Interframe compression techniques compress frames with reference to preceding and/or following frames, and are called typically called predicted frames. Examples of predicted frames include a Predictive (P) frame, a Super Predictive (SP) frame, and a Bi-Predictive or Bi-Directional (B) frame. A predicted frame is represented in terms of motion compensated prediction (or difference) from one or more other frames. A prediction residual is the difference between what was predicted and the original frame. In contrast, an I-frame or key frame is compressed without reference to other frames.

A video encoder typically receives a sequence of video frames including a current frame and produces compressed video information as output. The encoder compresses predicted frames and key frames. Many of the components of the encoder are used for compressing both key frames and predicted frames. The exact operations performed by those components can vary depending on the type of information being compressed.

FIG. 7 is a block diagram of a general video encoder system 700. The encoder system 700 receives a sequence of video frames including a current frame 705, and produces compressed video information 795 as output. Particular embodiments of video encoders typically use a variation or supplemented version of the generalized encoder 700.

The encoder system 700 compresses predicted frames and key frames. For the sake of presentation, FIG. 7 shows a path for key frames through the encoder system 700 and a path for forward-predicted frames. Many of the components of the encoder system 700 are used for compressing both key frames and predicted frames. The exact operations performed by those components can vary depending on the type of information being compressed.

A predicted frame (e.g., P-frame, SP-frame, and B-frame) is represented in terms of prediction (or difference) from one or more other frames. A prediction residual is the difference between what was predicted and the original frame. In contrast, a key frame (e.g., I-frame) is compressed without reference to other frames.

If the current frame 705 is a forward-predicted frame, a motion estimator 710 estimates motion of macroblocks or other sets of pixels (e.g., 16×8, 8×16 or 8×8 blocks) of the current frame 705 with respect to a reference frame, which is the reconstructed previous frame 725 buffered in the frame store 720. In alternative embodiments, the reference frame is a later frame or the current frame is bi-directionally predicted. The motion estimator 710 outputs as side information motion information 715 such as motion vectors. A motion compensator 730 applies the motion information 715 to the reconstructed previous frame 725 to form a motion-compensated current frame 735. The prediction is rarely perfect, however, and the difference between the motion-compensated current frame 735 and the original current frame 705 is the prediction residual 745. Alternatively, a motion estimator and motion compensator apply another type of motion estimation/compensation.

A frequency transformer 760 converts the spatial domain video information into frequency domain (i.e., spectral) data. For block-based video frames, the frequency transformer 760 applies a transform described in the following sections that has properties similar to the discrete cosine transform (DCT). In some embodiments, the frequency transformer 760 applies a frequency transform to blocks of spatial prediction residuals for key frames. The frequency transformer 760 can apply an 8×8, 8×4, 4×8, or other size frequency transforms.

A quantizer 770 then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 700 can use frame dropping, adaptive filtering, or other techniques for rate control.

When a reconstructed current frame is needed for subsequent motion estimation/compensation, an inverse quantizer 776 performs inverse quantization on the quantized spectral data coefficients. An inverse frequency transformer 766 then performs the inverse of the operations of the frequency transformer 760, producing a reconstructed prediction residual (for a predicted frame) or a reconstructed key frame. If the current frame 705 was a key frame, the reconstructed key frame is taken as the reconstructed current frame. If the current frame 705 was a predicted frame, the reconstructed prediction residual is added to the motion-compensated current frame 735 to form the reconstructed current frame. The frame store 720 buffers the reconstructed current frame for use in predicting the next frame. In some embodiments, the encoder applies a de-blocking filter to the reconstructed frame to adaptively smooth discontinuities in the blocks of the frame.

The entropy coder 780 compresses the output of the quantizer 770 as well as certain side information (e.g., motion information 715, quantization step size). Typical entropy coding techniques include arithmetic coding, differential coding, Huffman coding, run length coding, LZ coding, dictionary coding, and combinations of the above. The entropy coder 780 typically uses different coding techniques for different kinds of information (e.g., DC coefficients, AC coefficients, different kinds of side information), and can choose from among multiple code tables within a particular coding technique.

The entropy coder 780 puts compressed video information 795 in the buffer 790. A buffer level indicator is fed back to bit rate adaptive modules. The compressed video information 795 is depleted from the buffer 790 at a constant or relatively constant bit rate and stored for subsequent streaming at that bit rate. Alternatively, the encoder 700 streams compressed video information immediately following compression.

Before or after the buffer 790, the compressed video information 795 can be channel coded for transmission over the network. The channel coding can apply error detection and correction data to the compressed video information 795.

FIG. 8 is a block diagram of a general video decoder system 800. The decoder system 800 receives information 895 for a compressed sequence of video frames and produces output including a reconstructed frame 805. Particular embodiments of video decoders typically use a variation or supplemented version of the generalized decoder 800.

The decoder system 800 decompresses predicted frames and key frames. For the sake of presentation, FIG. 8 shows a path for key frames through the decoder system 800 and a path for forward-predicted frames. Many of the components of the decoder system 800 are used for compressing both key frames and predicted frames. The exact operations performed by those components can vary depending on the type of information being compressed.

A buffer 890 receives the information 895 for the compressed video sequence and makes the received information available to the entropy decoder 880. The buffer 890 typically receives the information at a rate that is fairly constant over time, and includes a jitter buffer to smooth short-term variations in bandwidth or transmission. The buffer 890 can include a playback buffer and other buffers as well. Alternatively, the buffer 890 receives information at a varying rate. Before or after the buffer 890, the compressed video information can be channel decoded and processed for error detection and correction.

The entropy decoder 880 entropy decodes entropy-coded quantized data as well as entropy-coded side information (e.g., motion information, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 880 frequently uses different decoding techniques for different kinds of information (e.g., DC coefficients, AC coefficients, different kinds of side information), and can choose from among multiple code tables within a particular decoding technique.

If the frame 805 to be reconstructed is a forward-predicted frame, a motion compensator 830 applies motion information 815 to a reference frame 825 to form a prediction 835 of the frame 805 being reconstructed. For example, the motion compensator 830 uses a macroblock motion vector to find a macroblock in the reference frame 825. The prediction 835 is therefore a set of motion compensated video blocks from the previously decoded video frame. A frame buffer 820 stores previous reconstructed frames for use as reference frames. Alternatively, a motion compensator applies another type of motion compensation. The prediction by the motion compensator is rarely perfect, so the decoder 800 also reconstructs prediction residuals.

When the decoder needs a reconstructed frame for subsequent motion compensation, the frame store 820 buffers the reconstructed frame for use in predicting the next frame. In some embodiments, the encoder applies a de-blocking filter to the reconstructed frame to adaptively smooth discontinuities in the blocks of the frame.

An inverse quantizer 870 inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 860 converts the quantized, frequency domain data into spatial domain video information. For block-based video frames, the inverse frequency transformer 860 applies an inverse transform described in the following sections. In some embodiments, the inverse frequency transformer 860 applies an inverse frequency transform to blocks of spatial prediction residuals for key frames. The inverse frequency transformer 860 can apply an 8×8, 8×4, 4×8, or other size inverse frequency transforms.

The variable coding resolution technique permits the decoder to maintain a desired video display resolution, while allowing the encoder the flexibility to choose to encode some portion or portions of the video at multiple levels of coded resolution that may be different from the display resolution. The encoder can code some pictures of the video sequence at lower coded resolutions to achieve a lower encoded bit-rate, display size or display quality. When desired to use the lower coding resolution, the encoder filters and down-samples the picture(s) to the lower resolution. At decoding, the decoder selectively decodes those portions of the video stream with the lower coding resolution for display at the display resolution. The decoder may also up-sample the lower resolution of the video before it is displayed on a screen with large pixel addressability. Similarly, the encoder can code some pictures of the video sequence at higher coded resolutions to achieve a higher encoded bit-rate, display size or display quality. When desired to use the higher coding resolution, the encoder filter retains a larger portion of the original video resolution. This is typically done by encoding an additional layer representing the difference between the video with larger resolution and the version of the lower resolution layer interpolated to match the size of the larger resolution video. For example, an original video may have a horizontal and vertical pixel resolution of 640 and 480 pixels, respectively. The encoded base layer may have 320×240 pixels. The first spatial enhancement layer may provide a resolution of 640×480 pixels. This spatial enhancement layer can be obtained by down-sampling the original video by a factor of 2 along the horizontal and vertical resolution. It is encoded by calculating the difference between the 640×480 video and the 320×240 base layer interpolated by a factor of 2 horizontally and vertically to match the 640×480 resolution of the first enhancement layer. At decoding, the decoder selectively decodes those portions of the video stream with the base and the higher spatial coding resolution for display at the display resolution or to supply a larger degree of details in the video, regardless of the resolution for the display.

In various embodiments, the video encoder 700 may provide variable coding resolutions on a frame-by-frame or other basis. The various levels of coding resolutions may be organized in the form of multiple video layers, with each video layer providing a different level of spatial resolution and/or temporal resolution for a given set of video information. For example, the video encoder 700 may be arranged to encode video information into a video stream with a base layer and an enhancement layer. The video information may comprise, for example, one or more frame sequences, frames, images, pictures, stills, blocks, macroblocks, sets of pixels, or other defined set of video data (collectively referred to as "frames"). The base layer may have a first level of spatial resolution and a first level of temporal resolution. The enhancement layer may increase the first level of spatial resolution, the first level of temporal resolution, or both. There may be multiple enhancement layers to provide a desired level of granularity when improving spatial resolution or temporal resolution for a given set of video information. The video layers may be described in more detail with reference to FIG. 9.

Figure 9:
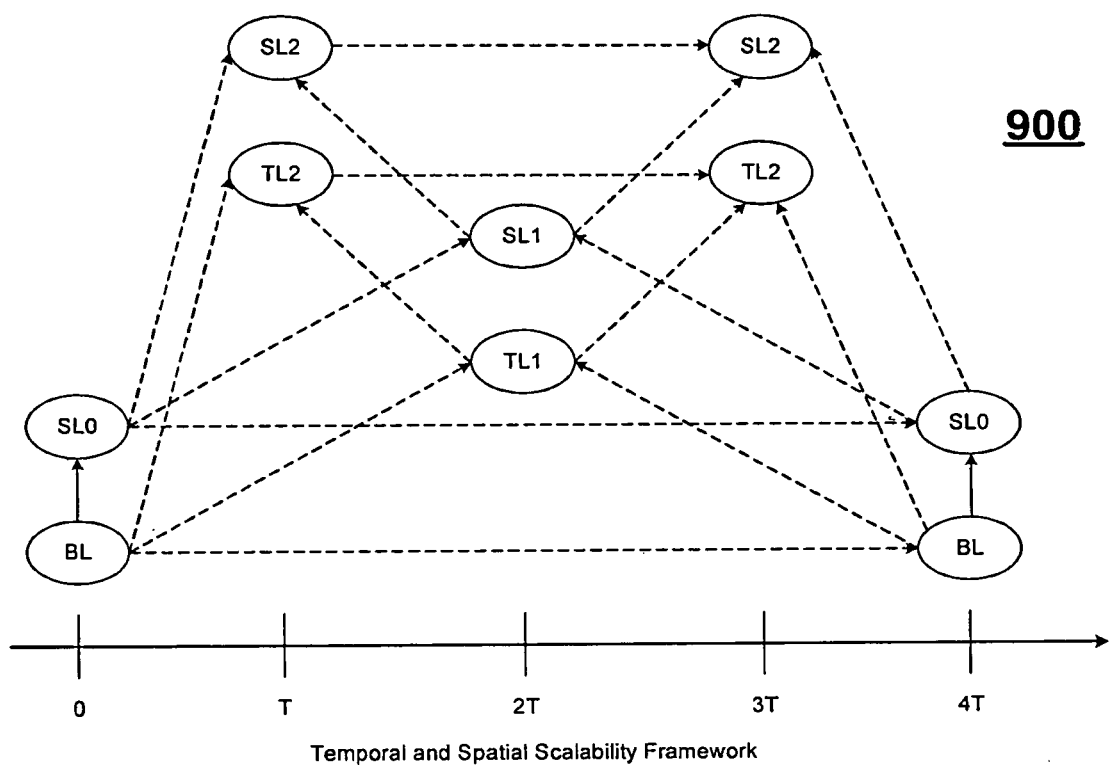
FIG. 9 illustrates an embodiment for a video layer hierarchy.

FIG. 9 illustrates an exemplary embodiment of a video layer hierarchy. FIG. 9 illustrates a hierarchical representation of multiple independent video layers 900 of coded digital video within a video stream. As shown in FIG. 9, the video layers 900 may comprise a base layer (BL). The BL may represent a base level of spatial resolution and a base level of temporal resolution (e.g., frame rate) video stream. In one embodiment, for example, a base level of temporal resolution may comprise T frame/s, where T=15 frame/s. The encoding of the video is such that decoding of subsequent BL video frames is only dependent on previous video frames from the same layer (e.g., one or more P, SP or B frames in the base layer).

The video layers 900 may also comprise one or more enhanced layers. For example, the enhanced layers may include one or more spatial enhancement layers, such as a first spatial enhancement layer (SL0), a second spatial enhancement layer (SL1), and a third spatial enhancement layer (SL2). SL0 represents a spatial enhancement layer which can be added to the BL to provide a higher resolution video at the same frame rate as the BL sequence (e.g., 15 frame/s). SL1 represents a spatial enhancement layer which can be added to the BL to provide a higher resolution video at a medium frame rate that is higher than the BL sequence. In one embodiment, for example, a medium frame rate may comprise T/2 frame/s, where T=30 frame/s. SL2 is a spatial enhancement layer which can be added to the BL to provide a higher resolution video at a higher frame rate that is even higher than the BL sequence. In one embodiment, for example, a higher frame rate may comprise T frame/s, where T=60 frame/s. It may be appreciated that the values given for T are by way of example only and not limitation.

The enhanced layers may also include one or more temporal enhancement layers, such as a first temporal enhancement layer (TL1) and a second temporal enhancement layer (TL2). TL1 represents a temporal enhancement layer which can be added to BL to produce the same lower resolution video as the BL but at a frame rate which is twice the frame rate for BL frames. As a result, motion rendition is improved in this sequence. TL2 represents a temporal enhancement layer which doubles the frame rate of BL and TL1. Motion rendition at this level is better than BL or TL1.

There are many combinations available for using the base layer and enhancement layers, as is indicated by the dashed arrows in FIG. 9. Some combinations may include, by way of example and not limitation, the following combinations:
BL
BL+SL0
BL+TL1
BL+TL1+TL2
BL+SL0+TL1+SL1
BL+SL0+TL1+SL1+TL2+SL2

These and other video layer combinations may ensure that the video quality is consistent in time. In some cases, it may be desirable to select the same number of spatial enhancement layers for all temporal layers so video quality is consistent in time.

As described more fully below, the encoder 700 specifies the maximum resolution in a sequence header within the compressed video bitstream 795 (FIG. 7). Coding the level of coding resolution in the sequence header of the video bitstream as compared to header information carried outside the bitstream, such as in header information of a container file format, or transmission carrier format, has the advantage that the maximum resolution is directly decodable by the video decoder. The maximum resolution does not have to be separately passed to the video decoder by the container file or transmission carrier decoder (e.g., channel decoder 652).

The encoder 700 further signals that a group of one or more pictures following an entry point in the video bitstream is coded at a lower resolution using a defined flag or start code in the entry point header. In some embodiments, if the flag indicates a lower or higher coding resolution, the coded size may also be coded in the entry point header as well.

The compressed video bitstream 795 (FIG. 7) includes information for a sequence of compressed progressive video frames or other pictures (e.g., interlace frame or interlace field format pictures). The bitstream 795 is organized into several hierarchical layers that are decoded by a decoder such as the decoder 800 of FIG. 8. The highest layer is the sequence layer, which has information for the overall sequence of frames. Additionally, each compressed video frame is made up of data that is structured into three hierarchical layers: picture, macroblock, and block (from top to bottom). Alternative video implementations employing the variable coding resolution technique can utilize other syntax structures having various different compositions of syntax elements.

Further, the compressed video bitstream can contain one or more entry points. Valid entry points in a bitstream are locations in an elementary bitstream from which a media processing system can decode or process the bitstream without the need of any preceding information (bits) in the bitstream. The entry point header (also called Group of Pictures header) typically contains critical decoder initialization information such as horizontal and vertical sizes of the video frames, required elementary stream buffer states and quantizer parameters, for example. Frames that can be decoded without reference to preceding frames are referred to as independent or key frames.

An entry point is signaled in a bitstream by an entry point indicator. The purpose of an entry point indicator is to signal the presence of a special location in a bitstream to begin or resume decoding, for example, where there is no dependency on past decoded video fields or frames to decode the video frame following immediately the entry point indicator. Entry point indicators and associated entry point structures can be inserted at regular or irregular intervals in a bitstream. Therefore, an encoder can adopt different policies to govern the insertion of entry point indicators in a bitstream. Typical behavior is to insert entry point indicators and structures at regular frame locations in a video bitstream, but some scenarios (e.g., error recovery or fast channel change) can alter the periodic nature of the entry point insertion. As an example, see Table 1 below for the structure of an entry point in a VC-1 video elementary stream, as follows:

TABLE 1

Entry-point layer bitstream for Advanced Profile

| ENTRYPOINT LAYER( ) { | Number of bits | Descriptor |
|---|---|---|
| BROKEN_LINK | 1 | uimsbf |
| CLOSED_ENTRY | 1 | uimsbf |
| PANSCAN_FLAG | 1 | uimsbf |
| REFDIST_FLAG | 1 | uimsbf |
| LOOPFILTER | 1 | uimsbf |
| FASTUVMC | 1 | uimsbf |
| EXTENDED_MV | 1 | uimsbf |
| DQUANT | 2 | uimsbf |
| VSTRANSFORM | 1 | uimsbf |
| OVERLAP | 1 | uimsbf |
| QUANTIZER | 2 | uimsbf |
| if (HRD_PARAM_FLAG == 1) { | | |
| HRD_FULLNESS ( ) | | |
| } | | |
| CODED_SIZE_FLAG | 1 | uimsbf |
| if (CODED_SIZE_FLAG == 1) { | | |
| CODED_WIDTH | 12 | uimsbf |
| CODED_HEIGHT | 12 | uimsbf |
| } | | |
| if (EXTENDED_MV == 1) { | | |
| EXTENDED_DMV | 1 | uimsbf |
| } | | |
| RANGE_MAPY_FLAG | 1 | uimsbf |
| if (RANGE_MAPY_FLAG == 1) { | | |
| RANGE_MAPY | 3 | uimsbf |
| } | | |
| RANGE_MAPUV_FLAG | 1 | uimsbf |
| if (RANGE_MAPUV_FLAG == 1) { | | |
| RANGE_MAPUV | 3 | uimsbf |
| } | | |
| } | | |

In various embodiments, the entry point indicators may be defined in accordance with a given standard, protocol or architecture. In some cases, the entry point indicators may be defined to extend a given standard, protocol or architecture. In the following Tables 1 and 2, various entry point indicators are defined as start code suffixes and their corresponding meanings suitable for bitstream segments embedded in a SMPTE 421M (VC-1) bitstream. The start codes should be uniquely identifiable, with different start codes for different video layers, such as a base layer and one or more enhancement layers. The start codes, however, may use similar structure identifiers between video layers to making parsing and identification easier. Examples of structure identifiers may include, but are not limited to, sequence headers, entry point headers, frame headers, field headers, slice headers, and so forth. Furthermore, start code emulation techniques may be utilized to reduce the possibility of start codes for a given video layer occurring randomly in the video stream.

Depending on a particular start code, a specific structure parser and decoder for each video layer may be invoked or launched to decode video information from the video stream. The specific structure parser and decoder may implement a specific set of decoder tools, such as reference frames needed, quantizers, rate control, motion compensation mode, and so forth appropriate for a given video layer. The embodiments are not limited in this context.

In various embodiments, the start code suffices may be backward compatible with the current VC-1 bitstream, so legacy VC-1 decoders should be able to continue working even if the VC-1 bitstream includes such new segments. The start code suffixes may be used to extend and build upon the current format of a SMPTE 421M video bitstream to support scalable video representation.

TABLE 2

| Start code Suffix | Meaning |
|---|---|
| 0x00 | SMPTE Reserved |
| 0x01-0x09 | SMPTE Reserved |
| 0x0A | End-of-Sequence |
| 0x0B | Slice |
| 0x0C | Field |
| 0x0D | Frame |
| 0x0E | Entry-point Header |
| 0x0F | Sequence Header |
| 0x10-0x1A | SMPTE Reserved |
| 0x1B | Slice Level User Data |
| 0x1C | Field Level User Data |
| 0x1D | Frame Level User Data |
| 0x1E | Entry-point Level User Data |
| 0x1F | Sequence Level User Data |
| 0x20-0x7F | SMPTE Reserved |
| 0x80-0xFF | Forbidden |

The start code suffixes shown in Table 2 may be appended at the end of an 0x000001 3-byte sequence to make various start codes. Such start codes are integrated in the VC-1 bitstream to allow video decoders to determine what portion of the bitstream they are parsing. For example, a sequence start code announces the occurrence of a sequence header in the VC-1 bitstream. Occurrences of bit sequences looking like start codes could be eliminated through start code emulation prevention that breaks such sequences into several pieces of bitstream that no longer emulate a start code.

In various embodiments, adding bitstream fragments representing additional video layers is achieved by adding new start codes to identify and signal the presence of the enhancement layers fragments in the bitstream. For example, with the 2 spatial layers and 3 temporal layers illustrated in FIG. 9, one could assign the following suffixes to signal the various layer bitstream segments relative to the contents they carry, as shown in Table 3 as follows:

TABLE 3

| Start Code Suffix | Meaning |
|---|---|
| 0x00 | SMPTE Reserved |
| 0x01-0x09 | SMPTE Reserved |
| 0x0A | End-of-Sequence |
| 0x0B | Slice |
| 0x0C | Field |
| 0x0D | Frame |
| 0x0E | Entry-point Header |
| 0x0F | Sequence Header |
| 0x10-0x1A | SMPTE Reserved |
| 0x1B | Slice Level User Data |
| 0x1C | Field Level User Data |
| 0x1D | Frame Level User Data |
| 0x1E | Entry-point Level User Data |
| 0x1F | Sequence Level User Data |
| 0x20 | Slice Level - SL0 |
| 0x21 | Slice Level - TL1 |
| 0x22 | Slice Level - SL1 |
| 0x23 | Slice Level - TL2 |
| 0x24 | Slice Level - SL2 |
| 0x30 | Field Level - SL0 |
| 0x31 | Field Level - TL1 |
| 0x32 | Field Level - SL1 |
| 0x33 | Field Level - TL2 |
| 0x34 | Field Level - SL2 |
| 0x40 | Frame Level - SL0 |
| 0x41 | Frame Level - TL1 |
| 0x42 | Frame Level - SL1 |
| 0x43 | Frame Level - TL2 |

TABLE 3-continued

| Start Code Suffix | Meaning |
| --- | --- |
| 0x44 | Frame Level - SL2 |
| 0x50 | Entry Point Level - SL0 |
| 0x51 | Entry Point Level - TL1 |
| 0x52 | Entry Point Level - SL1 |
| 0x53 | Entry Point Level - TL2 |
| 0x54 | Entry Point Level - SL2 |
| 0x60 | Sequence Level - SL0 |
| 0x61 | Sequence Level - TL1 |
| 0x62 | Sequence Level - SL1 |
| 0x63 | Sequence Level - TL2 |
| 0x64 | Sequence Level - SL2 |
| 0x80-0xFF | Forbidden |

The insertion of the fragments should follow a set of defined scope rules. For example, sequence level SL0 information should follow sequence level BL information and so forth.

Adaptive Scheduling

Figure 10:
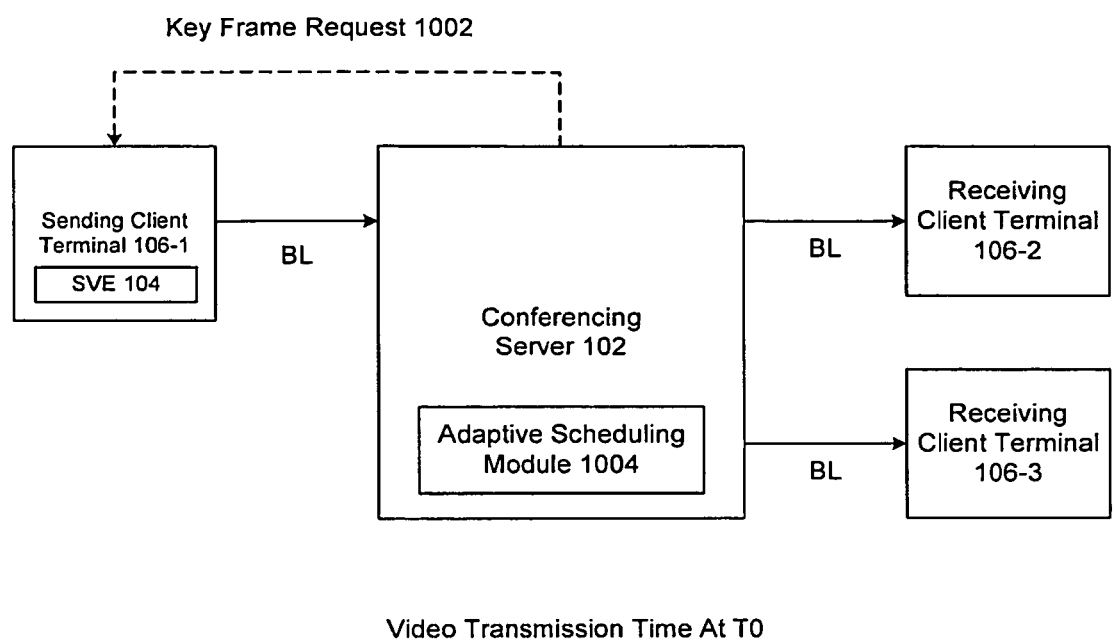
FIG. 10 illustrates a first diagram for an adaptive scheduling technique.

FIG. 10 illustrates a first logical diagram for an adaptive scheduling technique to use video scalability to improve latency in a Real Time Communication (RTC) system, such as multimedia conference system 100. When a new dominant or active speaker starts talking, such as from sending client terminal 106-1, conferencing server 102 may send a key frame request 1002 for a new video key frame so receiving client terminals 106-2, 106-3 can start rendering a display object with the new dominant speaker. A key frame, however, is relatively large and therefore it takes a greater amount of time to transmit it relative to other video frames. As a result, video latency is higher and it takes several seconds before the participant can see the new dominant speaker.

Various embodiments may solve these and other problems using an adaptive scheduling module 1004. Adaptive scheduling module 1004 may be arranged to allow adaptive scheduling of the transmission of the video layers in time on behalf of another device, such as sending client terminal 106-1. As a result, response time may be improved when a dominant or active speaker starts talking and sending his/her video. The lower video layers are transmitted first and additional layers are gradually transmitted to improve the video quality over time. In this manner, a visual composition may be rendered which smoothly transitions when a new dominant speaker begins speaking, thereby activating a switch in display objects to show video information for the new dominant speaker. Adaptively scheduling the transmission of video layers may reduce flicker, blanking, and other side effects introduced by the transition between dominant speakers and corresponding display objects in the visual composition.

In various embodiments, sending client terminal 106-1 may be implemented with a scalable video encoder 104 to send multiple video layers to conferencing server 102. Adaptive scheduling module 1004 of conferencing server 102 may be arranged to send lower video layers such as the base layer first to receiving client terminals 106-2, 106-3 when a new dominant speaker emerges via sending client terminal 106-1. Adaptive scheduling module 1004 may gradually increase the frame rate and/or the spatial resolution in the video stream by transmitting one or more enhancement layers to receiving client terminals 106-2, 106-3. Receiving client terminals 106-2, 106-3 thereby get the lower video layers first which are transmitted relatively quickly. Over time, depending on the available bandwidth on a given communication link 108, receiving client terminals 106-2, 106-3 may get higher frame rate and/or higher resolution content.

As shown in FIG. 10, upon switching to a new dominant speaker in a conference call, conferencing server 102 (or AVMCU) sends a request for a new key frame so all participants can start receiving video from that speaker. As opposed to sending a complete key frame will all layers, scalable video encoder 104 transmits only the base layer of the video to conferencing server 102. As a result the time to transmit and decode the video may be substantially reduced, thereby reducing the time it takes for participants to see the new dominant speaker.

Figure 11:
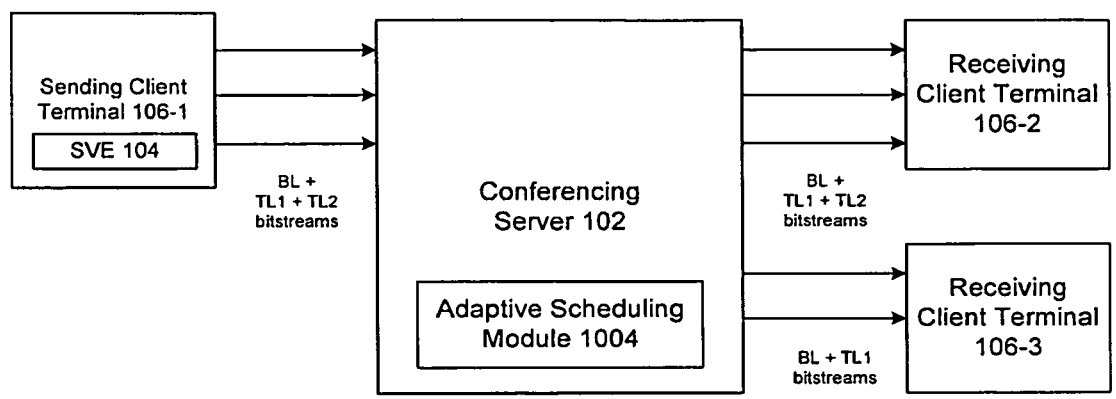
FIG. 11 illustrates a second diagram for an adaptive scheduling technique.

FIG. 11 illustrates a second logical diagram for an adaptive scheduling technique to use video scalability to improve latency in multimedia conference system 100. As shown in FIG. 11, shortly after adaptive scheduling module 1004 transmits the lower video layers, adaptive scheduling module 1004 progressively transmits more enhancement layers to provide a higher frame rate and/or higher resolution. FIG. 11 illustrates the case where the two temporal scales are transmitted to improve motion rendition in the video information.

Figure 12:
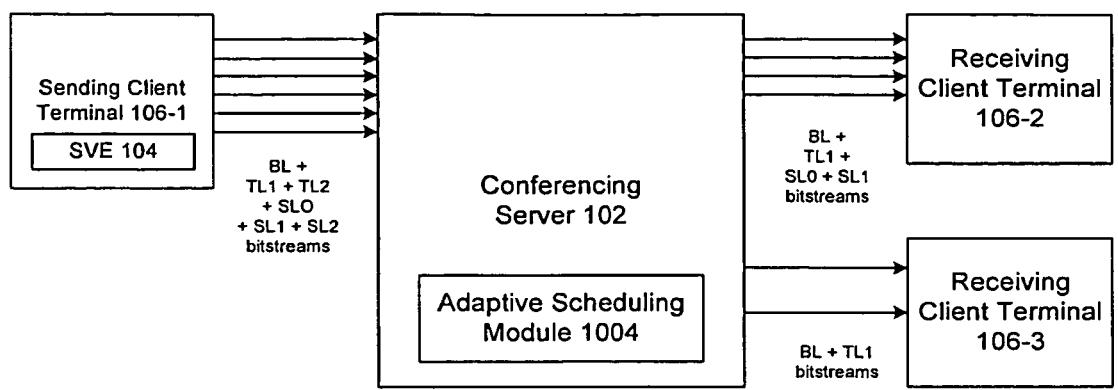
FIG. 12 illustrates a third diagram for an adaptive scheduling technique.

FIG. 12 illustrates a third logical diagram for an adaptive scheduling technique to use video scalability to improve latency in multimedia conference system 100. As shown in FIG. 12, once a steady state has been achieved at receiving client terminals 106-2, 106-3, adaptive scheduling module 1004 may send all of the remaining video layers to receiving client terminals 106-2, 106-3. Adaptive scheduling module 1004 determines the number of video layers to transmit depending on the available bandwidth available for the media channels over communication links 108-2, 108-3, respectively. As shown in FIG. 12, receiving client terminal 106-2 cannot receive the second spatial and temporal layers because the bandwidth is not high enough, while receiving client terminal 106-3 can only receive the base layer and the first temporal scale because the communication has limited bandwidth.

As shown in FIGS. 10-12, an adaptive scheduling technique may be used to smoothly transition between dominant speakers. In one embodiment, for example, a receiver may receive encoded video information in a video stream with different video layers including a base layer having a first level of spatial resolution and a first level of temporal resolution, and an enhancement layer increasing the first level of spatial resolution or the first level of temporal resolution. Adaptive scheduling module 1004 may be communicatively coupled to the receiver, and may be arranged to transmit the different video layers at different times to a receiving client terminal. The embodiments are not limited in this context.

In one embodiment, for example, adaptive scheduling module 1004 may be arranged to delay sending the enhancement layer until after the base layer has been sent. The embodiments are not limited in this context.

In one embodiment, for example, adaptive scheduling module 1004 may be arranged to send the base layer at a first time to the receiving client terminal when a new dominant speaker is determined. Determining a new dominant speaker may be accomplished any number of different ways, such as a using a dominant speaker detector at conferencing server 102, for example. The embodiments are not limited in this context.

In one embodiment, for example, adaptive scheduling module 1004 may be arranged to send the base layer at a first time to a receiving client terminal when a new dominant speaker is determined, and the enhancement layer at a second time after a defined waiting time. The defined waiting time period may be any time period sufficient to allow the receiving client terminal to accomplish a smooth transition between dominant speakers between display objects for a visual composition, as desired for a given implementation. Typically, the defined waiting time period may include sufficient time for the receiving client terminal to stabilize and reach a steady state with the desired level of video resolution and quality. The embodiments are not limited in this context.

In one embodiment, for example, adaptive scheduling module 1004 may be communicatively coupled to a transmitter. The transmitter may be used to transmit the base layer and the enhancement layer at different scheduled times. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, computing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, CD-ROM, CD-R, CD-RW, optical disk, magnetic media, magneto-optical media, removable memory cards or disks, various types of DVD, a tape, a cassette, or the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving encoded video information in multiple video streams each having different video layers with different levels of spatial resolution, temporal resolution and quality;
determining a total input bit rate for multiple display objects in which the encoded video information comprises parameters that specify the dimensions of the display resolution within the video stream; and
decoding video information from said different video layers for said display objects in accordance with a display object bit rate where a total display object bit rate for all display objects is equal to or less than said total input bit rate.

2. The method of claim 1, comprising processing parameters for a portion of a video stream that is signaled at an entry point level.

3. The method of claim 1, wherein the entry points are adjacent to, or adjoining, one or more subsequences or groups of pictures of the video sequence that begins with an intra-coded frame.

4. The method of claim 1, comprising allocating the display object bit rate to the multiple display objects where said total display object bit rate for all display objects is equal to or less than said total input bit rate.

5. The method of claim 1, comprising controlling access to each layer of the different video layers.

6. The method of claim 5, comprising using at least one of an encryption technique or a digital right to authorize access to each layer of the different video layers.

7. The method of claim 1, comprising performing at least one of increasing or decreasing a level of spatial resolution or a level of temporal resolution based on at least one of a type of video source, a type of video compression technique, a bandwidth or protocol available for a communication link, processing or memory resources available for a given receiving device, or a type of display device used to reproduce the digital video.

8. The method of claim 1, comprising coding the level of coding resolution in the sequence header of the video bitstream.

9. A method, comprising:
receiving encoded video information in multiple video streams each having different video layers with different levels of spatial resolution, temporal resolution and quality, each video stream having different video layers including a base layer having a first level of spatial resolution and a first level of temporal resolution, and an enhancement layer increasing said first level of spatial resolution or said first level of temporal resolution;
allocating a display object bit rate to multiple display objects; and
decoding video information from said different video layers for said display objects in accordance with said allocations.

10. The method of claim 9, comprising sending a subscription message to a conferencing server to subscribe to said different video layers for a conference call.

11. The method of claim 9, comprising modifying a display object bit rate for a display frame based on a size for said display frame or a location of said display frame on a display.

12. The method of claim 9, comprising modifying a display object bit rate for a display frame based on an instantaneous channel capacity for a communications link.

13. The method of claim 9, comprising rendering said decoded video information in each display frame to create a visual composition for a conference call.

14. The method of claim 9, comprising receiving said encoded video information in said video streams with different video layers each with different levels of spatial resolution, temporal resolution and quality for a conference call at a client terminal.

15. An apparatus comprising a processor to determine a total input bit rate for multiple display objects in which the encoded video information comprises parameters that specify the dimensions of the display resolution within the video stream, and decode the video information according to a display object bit rate for the multiple display objects where a total display object bit rate for all display objects is equal to or less than the total input bit rate, the video information in the multiple video streams each having different video layers with different levels of spatial resolution, temporal resolution and quality.

16. The apparatus of claim 15, said processor to modify a display object bit rate for a display frame based on a size for said display frame or a location of said display frame on a display.

17. The apparatus of claim 15, said processor to code a level of coding resolution in a sequence header of a video bitstream.

18. The apparatus of claim 15, comprising an encoder to indicate when a group of one or more pictures following an entry point in a video bitstream is coded at a lower resolution using a defined flag or start code in an entry point header.

19. The apparatus of claim 18, said encoder to code a coded size in the entry point header if the flag indicates a lower or higher coding resolution.

20. The apparatus of claim 15, comprising an encoder to encode the video information in said video streams, each video stream having different video layers including a base layer having a first level of spatial resolution and a first level of temporal resolution, and an enhancement layer increasing said first level of spatial resolution or said first level of temporal resolution.

* * * * *